United States Patent
Cranston et al.

(10) Patent No.: US 6,578,026 B1
(45) Date of Patent: Jun. 10, 2003

(54) METHOD AND SYSTEM FOR CONDUCTING REVERSE INDEX SCANS

(75) Inventors: Leslie Anne Cranston, Toronto (CA); Catherine S. McArthur, Uxbridge (CA); Matthew Albert Huras, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 09/628,600

(22) Filed: Jul. 28, 2000

(30) Foreign Application Priority Data

Jul. 29, 1999 (CA) .............................................. 2279092

(51) Int. Cl.[7] .............................................. G06F 17/30
(52) U.S. Cl. ...................... 707/2; 707/3; 707/7; 707/1; 707/100
(58) Field of Search ................. 707/3, 100, 2, 707/7, 1

(56) References Cited

U.S. PATENT DOCUMENTS 5,826,253 A * 10/1998 Bredenberg ..................... 707/2
5,924,088 A * 7/1999 Jakobsson et al. ............. 707/2

* cited by examiner

*Primary Examiner*—Jean M. Corrielus
*Assistant Examiner*—Gwen Liang
(74) *Attorney, Agent, or Firm*—Sandra M. Parker, Esq.

(57) ABSTRACT

A method executed by a data processor for scanning a reverse range. The scan is conducted in an index for a table having an upper end and a lower end. The reverse range has a start key value for defining the reverse range, and the index has a set of keys representing a set of records and record attributes in the table. Each key in the set of keys has a RID designating a record in the table and a key value corresponding to an attribute of the record in the table. The method includes the steps of searching the index for a start key, selecting an upper bound of the reverse range, and, if the upper bound is the first key in the index, indicating that the index does not contain any key value within the reverse range, or, if the upper bound is not the first key in the index, then fetching each key below the upper bound in the index.

49 Claims, 25 Drawing Sheets

Pseudocode for Deadlatch Prevention when Latching Previous Page

```
if (there is a previous page to the current page)
    { unfix the parent page
    conditionally latch the previous page
    if (we can't latch the page conditionally)
        { if (we are looking for a start key)
        { exit, indicating a retry is needed}
        save the LSN of the current page
        locate the first key on the current page
        if (the page is empty)
        {   make note of this}
        do
        {   unfix the current page (or 'original' page)
            fix the previous page unconditionally
            fix the original page again
            if (the LSN of the original page hasn't changed and we're
                logging)
                {   exit loop - we're done}
            else
                {   if (the page is no longer part of the index and a leaf)
                    { exit loop, indicating a retry is needed}
                if (the fist key was found on the original page before)
                    { locate that key again
                    if (the key is on the page)
                        { if (the key is no longer first on the page)
                        {set a flag indicating the key is on page but moved
                        exit loop, indicating a retry is needed } }
                    else
                        {if (the previous key is found and it's not the last key
                                        on the page)
                        {set a flag indicating the previous key is on the page }
                        exit loop, indicating a retry is needed } }
                    else
```

FIG. 11A

```
        {if (the page is no longer empty)
            {    exit loop indicating a retry is needed} }
        if (the original page still has the same previous page)
            { exit loop - we're done }
        else
            if (now no previous page)
                {exit loop, indicating we hit the beginning of the index}
            else
                { save the new LSN on the original page
                  unfix the previous page
                  conditionally latch the new previous page
                  if (successfully latched the page conditionally)
                      {   exit loop - we're done } } } }
        while (TRUE) } }
else
{   exit, indicating we hit the beginning of the index }
return
```

FIG. 11B

Pseudocode for Boundary Key Locking during Reverse Index Scans

Legend For Flags Used:

| | | |
|---|---|---|
| reverseScan | TRUE | This is a reverse scan: position on the last RID first for each key |
| | FALSE | This is a forward scan; position on the first RID first for each key |
| previfNoMatch | TRUE | If can't find exact key on page, return previous key |
| | FALSE | If can't find exact key on page, return next key |
| afterFirst | TRUE | Have already found and locked first key in range |
| | FALSE | Haven't yet found and locked first key in range |
| exclusiveStartKey | TRUE | start key is exclusive |
| | FALSE | start key is inclusive |
| unlockNextKey | TRUE | boundary key needs to be unlocked (after a retry) |
| | FALSE | no need to unlock boundary key |
| lockNextKey | TRUE | still need to lock boundary key |
| | FALSE | boundary key already locked |
| endOfScan | TRUE | hit the end of the scan |
| | FALSE | still not at end of scan |

Set reverseScan = TRUE since this is a reverse scan
Set lockNextKey = TRUE since haven't yet locked the boundary key
Set unlockNextKey = FALSE since haven't yet locked boundary key
Set afterFirst = FALSE since we haven't yet found the first key in range
Set endOfScan = FALSE since we haven't yet found end of the scan
Set previfNoMatch = FALSE until we get to the leaf level of the index

FIG. 12A

A:
Fix the root page of the index
if (this is an exclusive start key and afterFirst ==FALSE)
{ set reverseScan = FALSE for now so to find the first RID of a key first}

B:
If (not yet at the leaf level)
    {locate the start key in the current page
    if (the key is found or the next key is on the page)
      {fix the page on the next lower level of the index
       if (the page is not the right page)
         {latch the index
          retry from the root level (point A)}
       else
         {continue from point B}
    else
      {latch the index
      retry from the root level (point A)} }
else (at the leaf level)
    {set previfNoMatch = TRUE so we return the previous key if the
        exact key isn't found
    locate the start key in the current leaf page
    if (exclusiveStartKey == TRUE)
      {set reverseScan = TRUE again}

FIG. 12B

C:
```
if (we located the key or its previous key on the page)
      {check that the key is in range}
else if (we hit the beginning of the index)
  {set endOfScan =TRUE }
if (a key or previous key was found and is in range, and we're doing
      locking)
      {if (the look intent is X or U)
        { use the lock Intent}
      else
        {if (the isolation level is RR)
          { use an S (share) lock}
        else
          {use an NS (next share) lock} }
      if (a record is already locked)
          {if (unlockNext == TRUE
              {unlock the boundary key}
          else if (we're trying to relock the same key already locked with
                      the same lock Intent, or the same key but the lock
                      intent was not Instant and now is)
              {don't bother re-locking this row
                if (the lock Intent is now Instant)
                  {unlock the row} }
              else
                {unlock the locked row as it's no longer the right one} }
if (lockNext == TRUE)
      {if (we're not at the beginning of the index)
          {locate the next key on the page}
       else {locate the first key on the page (which is the first key in
                  the index)}
       if (there are no more keys on the page)
          {if (we haven't already fixed the next page)
              {fix it}
          locate the first key on the next page}
```

FIG. 12C

```
if (the isolation level is RR)
    {set up to get a medium S (share) lock}
else
    {set up to get an Instant lock}
if (we found a key)
    {lock its record conditionally}
else    {lock the end of the table conditionally}
if (we can't get a conditional lock)
    {unlatch pages
    wait for a medium S (share) lock unconditionally
    set unlockNext = TRUE
    retry search from root (point A)}
if (endOfScan == FALSE)
    {lock the record (that's first in range) conditionally
    if (we can't get a conditional lock)
        {unlatch pages
         wait for a medium S (share) lock unconditionally
         note: (don't need to find and re-lock boundary key
         retry search from root (point A)} } } }
if (key out of range)
    {set up to locate previous key, then validate it from point C}
else if (endOfScan == TRUE)
    {indicate scan complete}
else if (start key is lower than any key on this page)
    {conditionally latch the previous page
    if (we can't get the latch conditionally)
        {unlatch the pages
         latch the index
         retry search from root (point A)}
    else
        {locate the lost key on this previous page
         retry validating key from point C once only
         if (reach here a second time)
             {retry search from root (point A)} } } }
```

FIG. 12D

METHOD AND SYSTEM FOR CONDUCTING REVERSE INDEX SCANS

BACKGROUND OF THE INVENTION

1. Field of the Invention

The present invention relates to resource management systems, and more particularly to a method and system for reverse scanning of index key value ranges of records in resource management systems.

2. Description of the Related Art

A resource-management system is typically implemented using a computer or a network of computers and a server, having storage capability and appropriate software. A database management system is one type of resource-management system.

A typical database management system includes both database files and index files. The database files store data in the rows and columns of tables stored on data pages. In such a table, the rows may correspond to individual records while the columns of the table represent attributes of the records. For example, in a customer information table of a database management system, each row might represent a different customer, while each column represents different attributes of the customers such as the name of each customer, the amount owed by each customer and the cash receipts received from each customer.

Instead of providing for direct sorting and searching of the records in the tables, the database management system relies on the index files, which contain information or pointers about the location of the records in the tables stored in the database files. The index can be searched and sorted (scanned) much more rapidly than can the database files. An index is scanned through transactions in which criteria are stipulated for selecting records from a table. These criteria include keys, which are the attributes by which the database finds the desired record or records using the index. The actions of a transaction that cause changes to recoverable data objects are recorded in a log. Each log record is assigned a unique log sequence number (LSN) when the record is written to the log.

All data is stored in tables on a set of data pages that are separate from the indexes. All of the indexes for a table contain only the key values and record identifiers (RIDs) of records containing these key values. A RID consist of a data page ID concatenated with a sequence number unique within that range. One common type of index is a B-tree having N levels of nodes or pages. The starting node at the top of the tree is called the root node and defines the interval of key values that the B-tree index covers. In the successive lower levels of nodes before the lowest level of nodes, this key value interval is broken up into key value sub-intervals. Finally, the leaf nodes or pages in the lowest level of the tree contain the individual key values within the interval, together with the associated record (row) identifications (RIDs) that enable the records having those key values as attributes to be located in the tables of the database files. The leaf pages of an index contain entries (keys) each of which is conceptually a {key-value, RID} pair where the RID is treated as if it were an extra key field. A non-unique index is one that may contain more than one key with the same key value. In contrast, a unique index cannot contain more than one key with the same key value. Keys are maintained in an ascending collating order on all key fields, including the RID. Leaf pages alone contain next- and previous-page pointers so that ascending and descending range scans can be supported. Non-leaf pages contain child page pointers. FIG. 17 shows a non-unique B-tree index.

Where a non-unique index contains duplicate instances of a key value, the key value is stored only once on each leaf page. This single value is followed by as many RIDs as would fit on that page—this is called a cluster of duplicates. On leaf page 3 of the B-tree of FIG. 17, the key value P is followed by the cluster of duplicates 12 and 13. This cluster of duplicates 12 and 13 is notionally considered to be two keys: key <P, 12> and key <P, 13>.

Even if the actual data processor time required is very small, some transactions may require a considerable amount of time as data must be retrieved from storage facilities and must be input by the user requesting the transaction. Accordingly, it is important that the database management system permit the data processor to interleave different transactions. A set of transactions are interleaved when some transactions of the set are performed between separated operations of other transactions in the set as multiple users or application programs share common resources. This, however, may lead to problems, as the results that a transaction yields may depend on the way in which the transactions are interleaved, and may change if the transaction is re-executed for any reason.

Consider two transactions regarding the above-described customer information table. The two transactions have operations that are being interleaved. A payment has been received from a customer A and a first record-adjustment transaction is decreasing the accounts receivable attribute and increasing the cash receipts attribute for A by the amount of the payment. Concurrently, a second asset-totaling transaction is calculating the total assets of the company including both total accounts receivable and total cash receipts. Both of these transactions are performed though a number of interleaved operations. Depending on how the operations of the transactions are interleaved, the second transaction may sum the accounts receivable attribute column before the amount paid is removed from the row corresponding to A and may sum the cash receipts column after the amount paid has been added to such row, resulting in the amount aid being summed twice and the total assets of the company being overstated by the amount paid.

The degree to which the results provided by a transaction may differ depending on the manner in which different transactions are interleaved depends on the isolation level of the system. Interleaving different transactions may impact on the results returned by a transaction in the following ways:

Lost updates: Transactions T1 and T2 both read data from the same record (row) and both update the same attribute (column) of such record. If T1 updates the attribute, and then T2 subsequently updates the same attribute based on T2's read of the record prior to T1 updating the attribute, then T1's update of the attribute will be lost.

Access to uncommitted data: Transaction T1 updates a value in a database and Transaction T2 reads that value before T1 commits. Subsequently, T1 rolls back. T2's calculations are based on data that is no longer recorded and is presumably invalid.

Nonrepeatable reads: Transaction T1 reads a row, then performs other operations. After T1 has read the row, Transaction T2 changes the row. If T1 subsequently tries to read this row again, a different result will be returned then from the first time.

Phantom Read: Transaction T1 reads a set of rows based on some search criterion and then performs other operations. After T1 has read the set of rows, Transaction T2 updates existing rows or inserts new rows. T1 subsequently repeats the search and returns results that differ from those originally returned.

Different isolation levels block some or all of these potential problems. Two such different isolation levels are cursor stability (CS) and repeatable read (RR). RR locks all rows an application references within a transaction. No other transactions can update, delete or insert a row that would affect the results of the transaction that requested and received the lock. Accordingly, at RR isolation levels none of the above-described problems can arise. In contrast, at CS isolation levels any row accessed by a transaction is locked while the cursor is positioned on that row. This lock remains in effect until the next row is fetched. However, if any data in the row is changed, then this lock is held until the change is committed. Accordingly, at both the CS and RR isolation levels, only committed data is returned to a specific transaction unless the specific transaction itself has added the data; Further, if all transactions are run at RR isolation levels, then their concurrent executions are serializable in the sense that the same results follow whether the transactions are executed concurrently or serially. However, this is not the case with the CS isolation level as both nonrepeatable reads and phantom reads are possible at this isolation level.

Locks and latches are used to synchronize concurrent activities. Latches are used to guarantee physical consistency of data while locks are used to assure logical consistency of data. Locks are typically invoked by transactions, while latches are invoked by processes-in a single transaction there may be multiple processes. Accordingly, latches are usually held for a much shorter period of time than locks. Acquiring a latch is much cheaper than acquiring the lock as the latch control information is always in virtual memory in a fixed place, which is accessible given the name. In contrast, lock storage is dynamically managed and more instructions are required to acquire and release locks.

Lock requests may be conditional or unconditional. A conditional request means that the requestor is unwilling to wait if the lock is not immediately grantable when the request is processed. An unconditional request means the requestor is willing to wait until the lock becomes grantable. Locks may be held for different durations. An unconditional request for an instant duration lock means that the lock is not to be actually granted but the lock manager has to delay returning the lock call with the success status until the lock becomes grantable. In contrast, longer duration locks are released sometime after they are acquired and typically long before the transaction terminates. Commit duration locks are released only when the transaction terminates.

To provide the desired isolation level while at the same time permitting the concurrent execution of transactions, database management systems may include a lock manager module. The lock manager module maintains a lock table that indicates what resources are being accessed by different transactions. The type of lock maintained will depend on the type of transaction. Thus, the above-described asset-totaling transaction that determines the total assets of a company by totaling the accounts receivable column and the cash receipts column among others will request a share lock S from the lock manager to lock both of these columns as well as the columns of other tables pertaining to the company's assets. This share lock does not prevent other transactions from accessing the locked resources, but does prevent the locked resources from being changed by, for example, insertion or deletion operations.

In contrast, the above-described record-adjustment transaction that adjusts the accounts receivable and cash receipts attributes of the record for customer A will request an exclusive lock X on at least those attributes of the record that are being changed. While a share lock S is compatible with other share locks, an exclusive lock X is incompatible with both other share locks and other exclusive locks. Accordingly, where the asset-totaling transaction has requested and received a share lock S on all of the attributes in the accounts receivable and cash receipts columns of the customer information table, the record-adjustment transaction's request for an exclusive lock on the accounts receivable and cash receipts attributes of customer A will be denied, and the updating transaction will have to wait until the asset-totaling transaction releases the share lock on these attributes before being granted the exclusive lock X.

To perform the above-described asset-totaling transaction while maintaining RR, it is not sufficient to simply lock each of the attributes of the account receivable and cash receipts columns individually. For example, consider a case in which new customers are being added to the database. It is preferable that the asset-totaling transaction reflect either all of these new customers, or none of these new customers. Say, however, that the asset-totaling transaction places only individual share locks on the individual attributes in the accounts receivable and cash receipts columns of the customer information table. While the asset-totaling transaction is executing, a record-adding transaction is interleaved in which new customers are added to the customer information table, thereby adding new rows to the table, which new rows include values for accounts receivable and cash receipts. The insertion of these new accounts receivable and cash receipts values will not be impeded by the share lock S on the preexisting values in these columns, and, depending on how these two transactions are interleaved, some of the new accounts receivable and cash receipts entries may be included in the total assets calculated by the asset-totaling transaction, while other cash receipts and accounts receivable values added by the record-adding transaction are not. If the asset-totaling transaction subsequently recalculates the total assets, then it may return a different value, violating RR protocol.

To preserve the RR isolation level, database management system lock entities other than just records. For example, some database management systems may lock an entire file when a range is being scanned in that file. However, this solution significantly reduces the system concurrency. Alternatively, some database management systems employ range locking in which key value ranges are also listed as resources in the lock table. Accordingly, when a transaction includes a range scanning operation, the transaction will request a lock against this key value range before executing the operation. For example, before the above-described asset-totaling transaction scans all of the accounts receivable values, this transaction will request a lock against the entire column containing the accounts receivable values. The record-adding transaction must wait for this lock to be released before adding accounts receivable information regarding the new customer to the customer information table:

In order to lock key-value ranges, database management systems may rely on boundary key locking. Say an accounts receivable read transaction requests the RIDs of all records having accounts receivable attributes that exceed $1000. Before this forward scan starts traversing the index tree, it will not know what locks to obtain as it will not know what key values exist that exceed $1000. Accordingly, the locking for this forward scan must be postponed until a key value exceeding $1000 is found or it is determined that no customer owes more than $1000. As key values over $1000 are determined, share locks on these key values and a lock on the end of the file (EOF) for this index are requested conditionally, while a latch is held on each leaf page involved in the scan. Locks may not be immediately available as some of the key values located may be in an uncommitted state. If so, then the latch on the leaf page containing the key value is released and the lock is requested unconditionally. As each key having a key value over $1000 is eventually locked, the key value of such key is together with the key's RIDs.

Say locks are obtained on the key values $1200 and $1450 as well as on the EOF for this index. With boundary key locking, these locks are really range locks covering disjoint ranges that are open at their lower ends and closed at their upper ends. The lock on the $1200 covers the range ($1000, $1200]; the lock on the $1450 covers the range ($1200, $1450]; and the lock on the EOF covers the range ($1450, EOF]. Accordingly, if, before this forward scan transaction commits, an insert transaction seeks to insert a key value exceeding $1000, then such key value will fall into one of these three locked ranges and cannot be inserted until the forward range scan commits and the locks are released. Specifically, say the insert transaction seeks to insert the key value $1300. Then the insert transaction will request and be denied an instant exclusive lock on the next key value, $1450, and will have to wait until the forward range scan commits and the locks are released. In contrast, say that before the forward range scan locates the key values exceeding $1000, a delete transaction has deleted the key value $1300, but has not committed. Then such delete transaction will have placed an exclusive lock of commit duration on the next key value $1450, which lock will prevent the forward scan transaction from obtaining a lock on the key value 1450, and thereby delay the forward scan transaction until the delete transaction commits.

No additional searching is required to locate the boundary key or upper bound for a forward scan as the forward scan of the index continues until either a value larger than the stop key (if there is one) or the EOF is reached. Accordingly, boundary key locking may be readily implemented as a means of range locking in forward scans. Sometimes, however, it will be advantageous for a database management system to permit reverse scans to be conducted of a reverse range defined by a selected upper boundary. With conventional database management systems it is necessary to do table scans, thereby losing the advantages associated with scanning an index. Alternatively, the index could be scanned in a forward direction and the results output to a temporary table. This temporary table could then be put in the opposite order and the results returned from that. While permitting the index to be used, this alternative approach is highly inefficient in terms of the number of steps required.

In order to permit reverse scans to be conducted at a selected isolation level, such isolation level must be maintained relative to forward transactions as well as relative to other reverse transactions. Further, such reverse scanning should be generally compatible with forward transactions and should be implemented as efficiently as possible. Thus, an improved database management system that permits reverse range scanning and integrates such scanning with the existing capabilities of database management system is desirable.

SUMMARY OF THE INVENTION

An object of one aspect of the present invention is to provide an improved scanning method in a data processing system.

In accordance with an aspect of the invention, there is provided a method executed by a data processor for scanning a reverse range. The scan is conducted in an index for a table having an upper end and a lower end. The reverse range has a start key value for defining the reverse range and the index has a set of keys representing a set of records in record attributes in the table. Each key in the set of keys has a RID designated in a record in the table and a key value corresponding to an attribute of the record in the table. The method comprises the steps of searching the index for a start key, selecting an upper bound of the reverse range, and, depending on whether the upper bound is the first key in the index, determining the contents of the reverse range. In the step of searching the index for a start key, the start key is selected to be a lowest key in the index having a start key value if the start key value is exclusive, and is selected to be a highest key in the index having the start key value if the start key value is inclusive. In the step of selecting an upper bound of the reverse range, the way in which the upper bound is selected depends on whether the start key is inclusive or exclusive, and on where the start key is or is not found relative to the index. Specifically, if the start key is in the index and is inclusive, then the upper end of the index is selected to be the upper bound if the start key value is a highest key value in the index, otherwise, the upper bound is selected to be the next higher key after the start key in the index. If the start key is in the index and is exclusive, then the start key is selected to be the upper bound. If the start key is not in the index and the start key value is lower than the lowest key value in the index, then the upper bound is selected to be a first key in the index. If the start key is not in the index and the lowest key value in the index is less than the start key value, then the upper bound is selected to be the upper end of the table if the start key value is higher than the highest key value in the index, otherwise the upper bound is selected to be the lowest key in the index having a key value exceeding the start key value. If the upper bound is the first key in the index, then the method indicates that the index does not contain any key values within the reverse range. On the other hand, if the upper bound is not the first key in the index, then each key below the upper bound in the index is fetched. Preferably, the method further comprises restricting access to the upper bound during scanning to preserve the selected isolation level.

In accordance with another aspect of the invention, there is provided a computer-program product for an application program for scanning a reverse range. The scan is conducted in an index for a table having an upper end and a lower end. The reverse range has a start key value for defining the reverse range and the index has a set of keys representing a set of records in record attributes in the table. Each key in the set of keys has a RID designated in a record in the table and a key value corresponding to an attribute of the record in the table. The method comprises the steps of searching the index for a start key, selecting an upper bound of the reverse range, and, depending on whether the upper bound is the first key in the index, determining the contents of the reverse range. In the step of searching the index for a start key, the start key is selected to be a lowest key in the index having a start key value if the start key value is exclusive, and is selected to be a highest key in the index having the start key value if the start key value is inclusive. In the step of selecting an upper bound of the reverse range, the way in which the upper bound is selected depends on whether the start key is inclusive or exclusive, and on where the start key is or is not found relative to the index. Specifically, if the start key is in the index and is inclusive, then the upper end of the index is selected to be the upper bound if the start key value is a highest key value in the index, otherwise, the upper bound is selected to be the next higher key after the start key in the index. If the start key is in the index and is exclusive, then the start key is selected to be the upper bound. If the start key is not in the index and the start key value is lower than the lowest key value in the index, then the upper bound is selected to be a first key in the index. If the start key is not in the index and the lowest key value in the index is less than the start key value, then the upper bound is selected to be the upper end of the table if the start key value is higher than the highest key value in the index, otherwise the upper bound is selected to be the lowest key in the index having a key value exceeding the start key value. If the upper bound is the first key in the index, then the method indicates that the index does not contain any key values within the reverse range. On the other hand, if the upper bound is not the first key in the index, then each key below the upper bound in the index is fetched.

In accordance with a further aspect of the present invention, there is provided a data processing system for scanning a reverse range. The scan is conducted in an index for a table having an upper end and a lower end. The reverse range has a start key value for defining the reverse range and the index has a set of keys representing a set of records in record attributes in the table. Each key in the set of keys has a RID designated in a record in the table and a key value corresponding to an attribute of the record in the table. The method comprises the steps of searching the index for a start key, selecting an upper bound of the reverse range, and, depending on whether the upper bound is the first key in the index, determining the contents of the reverse range. In the step of searching the index for a start key, the start key is selected to be a lowest key in the index having a start key value if the start key value is exclusive, and is selected to be a highest key in the index having the start key value if the start key value is inclusive. In the step of selecting an upper bound of the reverse range, the way in which the upper bound is selected depends on whether the start key is inclusive or exclusive, and on where the start key is or is not found relative to the index. Specifically, if the start key is in the index and is inclusive, then the upper end of the index is selected to be the upper bound if the start key value is a highest key value in the index, otherwise, the upper bound is selected to be the next higher key after the start key in the index. If the start key is in the index and is exclusive, then the start key is selected to be the upper bound. If the start key is not in the index and the start key value is lower than the lowest key value in the index, then the upper bound is selected to be a first key in the index. If the start key is not in the index and the lowest key value in the index is less than the start key value, then the upper bound is selected to be the upper end of the table if the start key value is higher than the highest key value in the index, otherwise the upper bound is selected to be the lowest key in the index having a key value exceeding the start key value. If the upper bound is the first key in the index, then the method indicates that the index does not contain any key values within the reverse range. On the other hand, if the upper bound is not the first key in the index, then each key below the upper bound in the index is fetched.

BRIEF DESCRIPTION OF THE DRAWINGS

FIGS. 11A and 11B illustrate a pseudo code listing for deadlatch prevention aspects of the reverse range scanning process of FIGS. 8 to 10;

FIGS. 12A–12D illustrate a pseudo code listing for boundary key locking aspects of the reverse range scanning process of FIGS. 3 to 7;

DETAILED DESCRIPTION OF THE PREFERRED EMBODIMENTS

Figure 1:
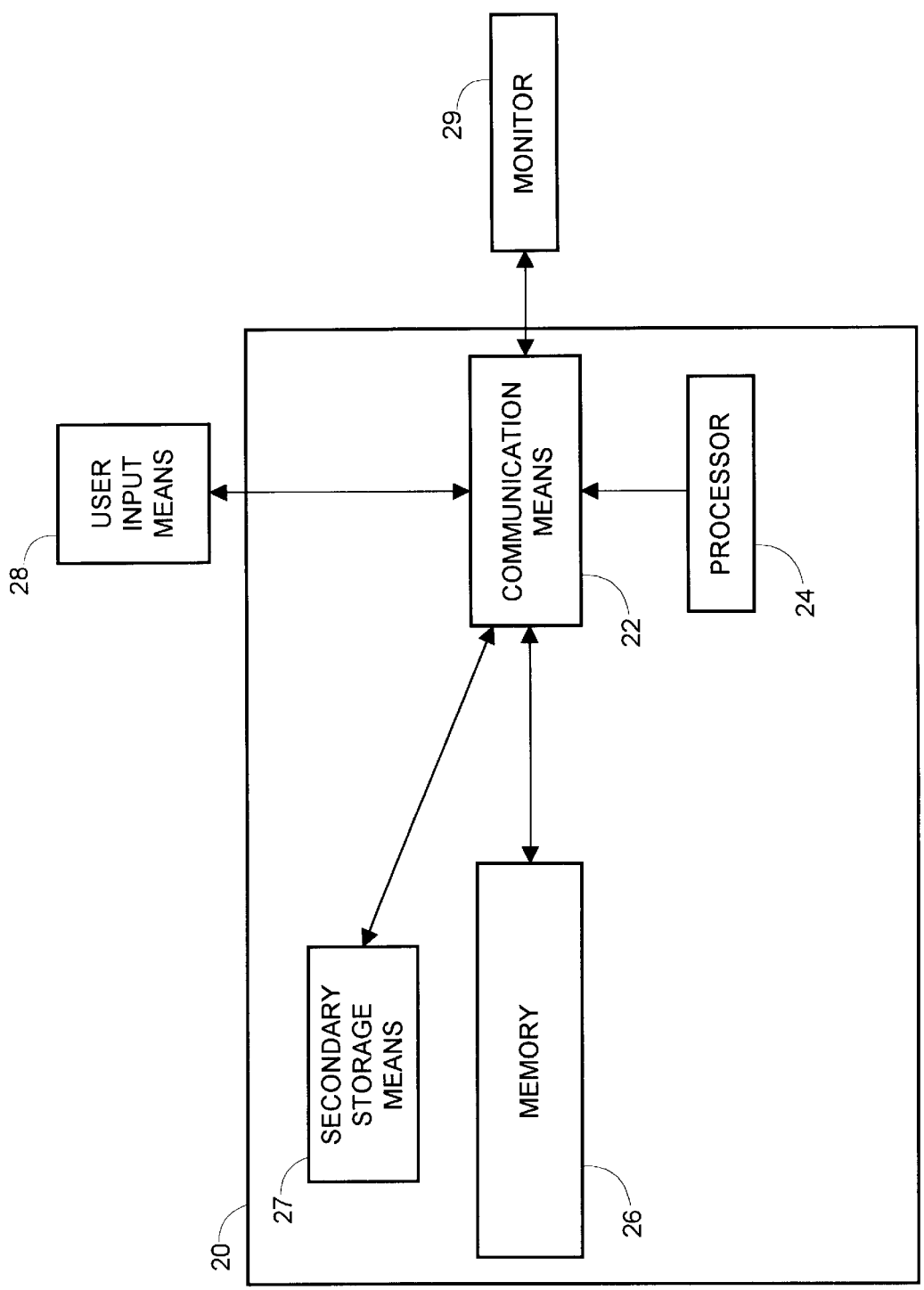
FIG. 1, in a block diagram, illustrates a computer system that may be configured to implement an embodiment of the invention.

Referring to FIG. 1, there is illustrated a computer system 20 on which a preferred embodiment of the present invention can be implemented. The computer system 20 includes a communicating means 22 for communicating information, and a processor 24 that is connected to the communication means 22. The computer system 20 further comprises a memory 26 for storing data records and instructions regarding the manipulation of such data records, and a secondary storage means 27 such as a disk drive or hard drive. The memory 26 is connected to the processor 24 via the communication means 22, as are user input means 28, such as a keyboard or mouse, and a monitor 29. In the preferred embodiment, the present invention relates to the use of the computer system 20 to execute a database management system that accommodates both reverse and forward scanning (of indexes or ranges of records). Details of the locking program are provided below.

BOUNDARY KEY LOCKING

In reverse range scanning, the range to be scanned is defined by an upper bound or boundary. The boundary may be beyond the end of the index (higher than any key in the index), or may be a key value within the index. If the boundary is a key value below the end of the table, the boundary may be closed (in that the boundary is contained within the range to be scanned) or may be open (in that the boundary is outside the range to be scanned). If the boundary is beyond the end of the table, the end of table (the end of file or EOF) provides the boundary.

In a transaction involving forward scanning of the indexes of database management systems, the transaction continues to scan forward in the index until a key value is reached that is outside the range or the end of file is reached. The transaction typically locks all of the values in the range returned, as well as the next key value that is reached when the forward scanning portion of the transaction is completed. When subsequent operations attempt to secure a lock on these locked keys, they may, depending on the compatibility of the requested locks with the existing locks, have to wait until the present locks are released. This permits the required isolation level to be maintained.

When incorporating reverse range scanning into database management systems that provide forward operations, there is a need to maintain isolation levels as well as a need to prevent deadlatching and deadlocking between forward operations and reverse operations.

Tables 1 to 6 that follow, illustrate isolation violations that can occur when reverse scans are interleaved with forward deletion and insertion operations.

REVERSE SCAN INTERLEAVED WITH A DELETION OPERATION

TABLE 1

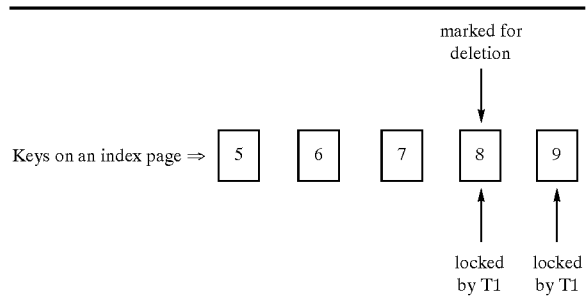

In Table 1, transaction 1 (T1) is deleting key 8. T1 must lock key 9 and then key 8 in order to delete key 8. Key 8 is shown marked for deletion.

TABLE 2

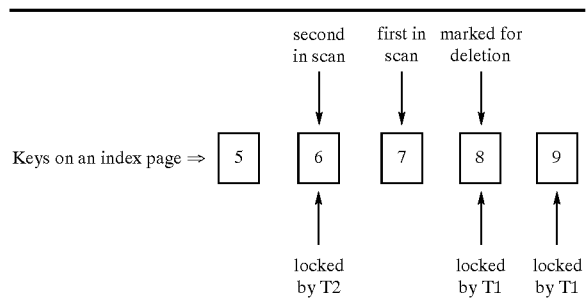

In Table 2, T1 has locked keys 8 and 9 and has marked key 8 for deletion. T2 is scanning a reverse range having a closed upper bound at 8—the scan is for keys that are less than or equal to 8. When T2 searches for the start key of 8, it finds key 7 since key 8 is marked as deleted. Key 7 is the first key in T2's scan.

TABLE 3

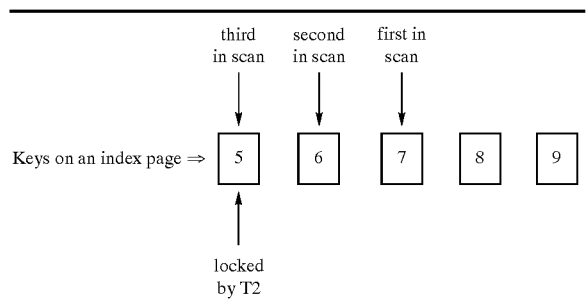

In Table 3, key value 5 has been scanned by T2 and is the third value scanned by T2 T1 rolls back and key 8 is restored and is no longer marked for deletion. As key 8 meets the search criteria for T2, key 8 should have been returned by T2 and so should have been included in the query. However, key B is not returned by T2, which violates both RR and CS isolation levels.

REVERSE SCAN INTERLEAVED WITH AN INSERTION OPERATION

TABLE 4

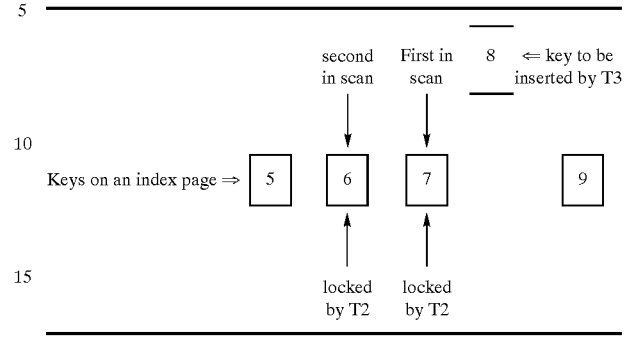

In Table 4, T2 is scanning a reverse range having a closed upper bound at key 8. T2 searches for the start key of the index and finds key 7 since key 8 is not in the index. T2 continues to scan to the left. Transaction 3 (T3) is inserting key 8 (which was previously not in the index).

TABLE 5

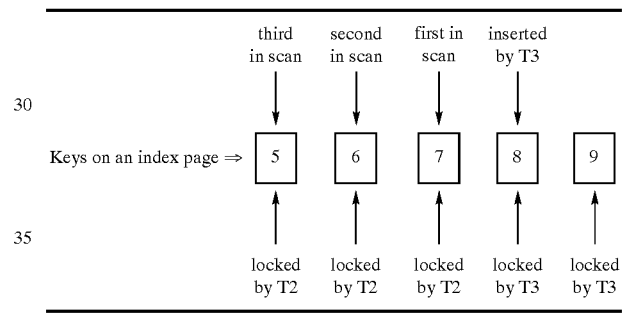

T3 is an insertion transaction that seeks to insert key 8. As shown in Table 5, in order to insert key 8, T3 requests a lock on key 9. When this lock is granted, T3 inserts key 8.

TABLE 6

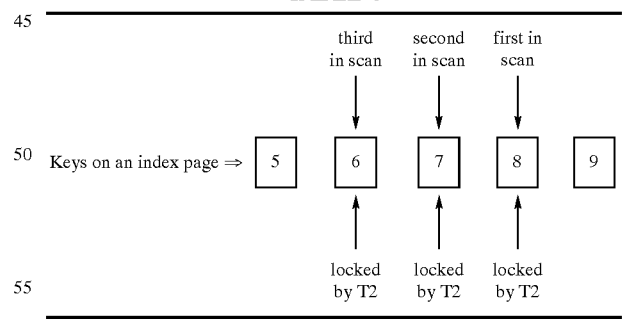

As shown in Table 6, if T2 performs the query again it will see key 8, violating repeatable read since this result is different from the first T2 scan. This does not violate the CS isolation level.

As shown in Tables 7 to 12 below, boundary key locking (upper bound locking) in reverse range scanning can overcome the isolation violation problems shown in Tables 1 to 6 that can arise when reverse range scanning is interleaved with insertion and deletion operations.

REVERSE SCAN WITH BOUNDARY KEY LOCKING: THE DELETION OPERATION

TABLE 7

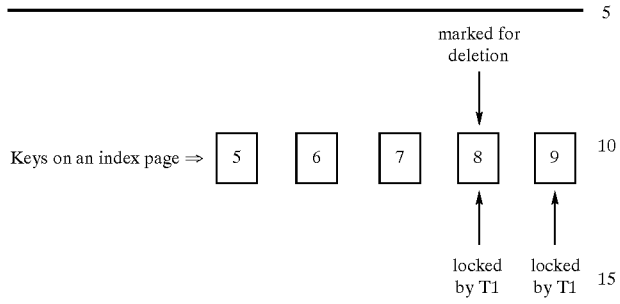

Table 7 corresponds to Table 1. T1 must lock key 9 and then key 8 in order to delete key 8. Key 8 is marked for deletion.

TABLE 8

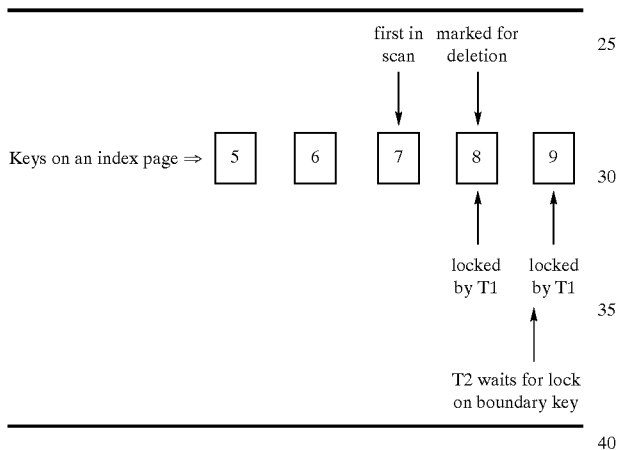

Table 8 resembles Table 2 in that when T2 searches for the start key 8, T2 finds key 7 since key 8 is deleted. However, unlike the situation shown in Table 2, T2 then tries to lock the next higher key or boundary key, namely key 9. As T1 has already locked key 9, T2 must wait on T1.

TABLE 9

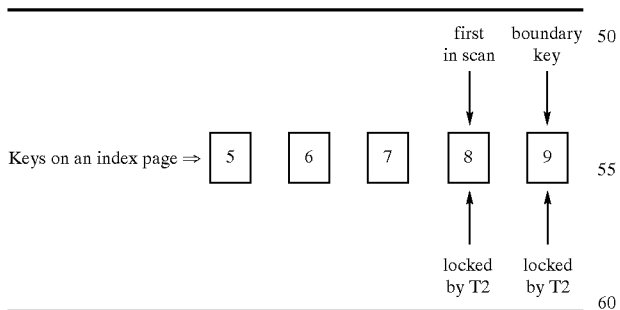

As shown in Table 9, if T1 rolls back, key 8 is made available and the locks on keys 8 and 9 are released. T2 gets the lock on boundary key 9 and then moves back one key to begin the reverse scan, Finding key 8 and starting the scan with it.

TABLE 10

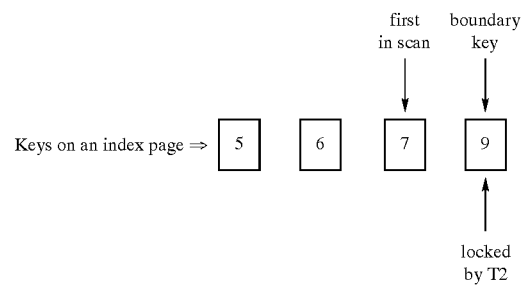

On the other hand, as shown in Table 10, if T1 commits, key 8 is deleted and the lock on key 9 is rejoined. T2 gets the locks on key 9 and moves back one key to begin the reverse scan, finding key 7 and starting the scan with it.

REVERSE SCAN WITH BOUNDARY KEY LOCKING INTERLEAVED WITH AN INSERTION OPERATION

TABLE 11

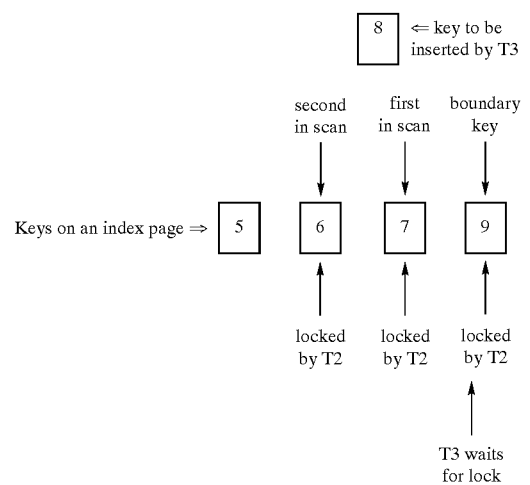

Table 11 shows T2 conducting a reverse scan. If the reverse scan is an RR scan, then T2 must first lock the boundary key before locking the first key in the range. As a result, T3 must wait to get the next key lock on key 9 before inserting key 8. Thus, T3 must wait until T2 commits and releases its lock on key 9, before inserting key 8.

As discussed above, in forward scanning the next key after a range is determined automatically as the transaction continues to scan forward in the index until this key is reached. No special or additional searching is required in order to lock this key as well as all of the keys in the forward range. For a reverse scan, however, the highest key in the range is the start key that is searched for, at which point the scan runs to the left. Thus, before beginning the scan, the next key higher than the highest key in the range needs to be found and locked.

Referring to FIGS. 2 to 7, flow charts are shown for boundary key locking aspects of a reverse range scanning process in accordance with a preferred aspect of the invention. In the reverse range scanning process, the next key is located and locked before a reverse scan is conducted. These flow charts are described below with reference to an example.

Figure 2:
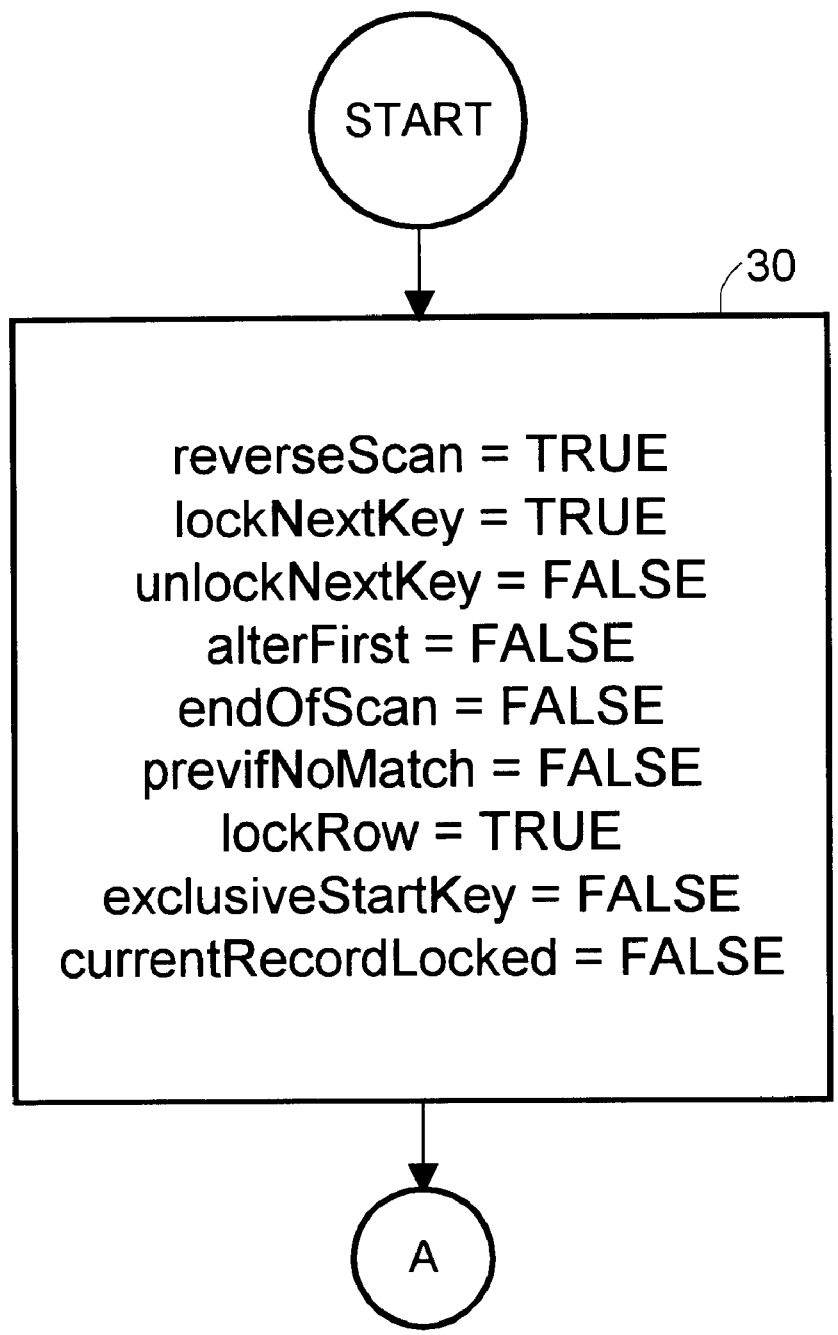
FIG. 2 is an initializing flow chart showing the initial status of flags used by boundary key locking aspects of a reverse range scanning process in accordance with an aspect of the invention.
Figure 17:
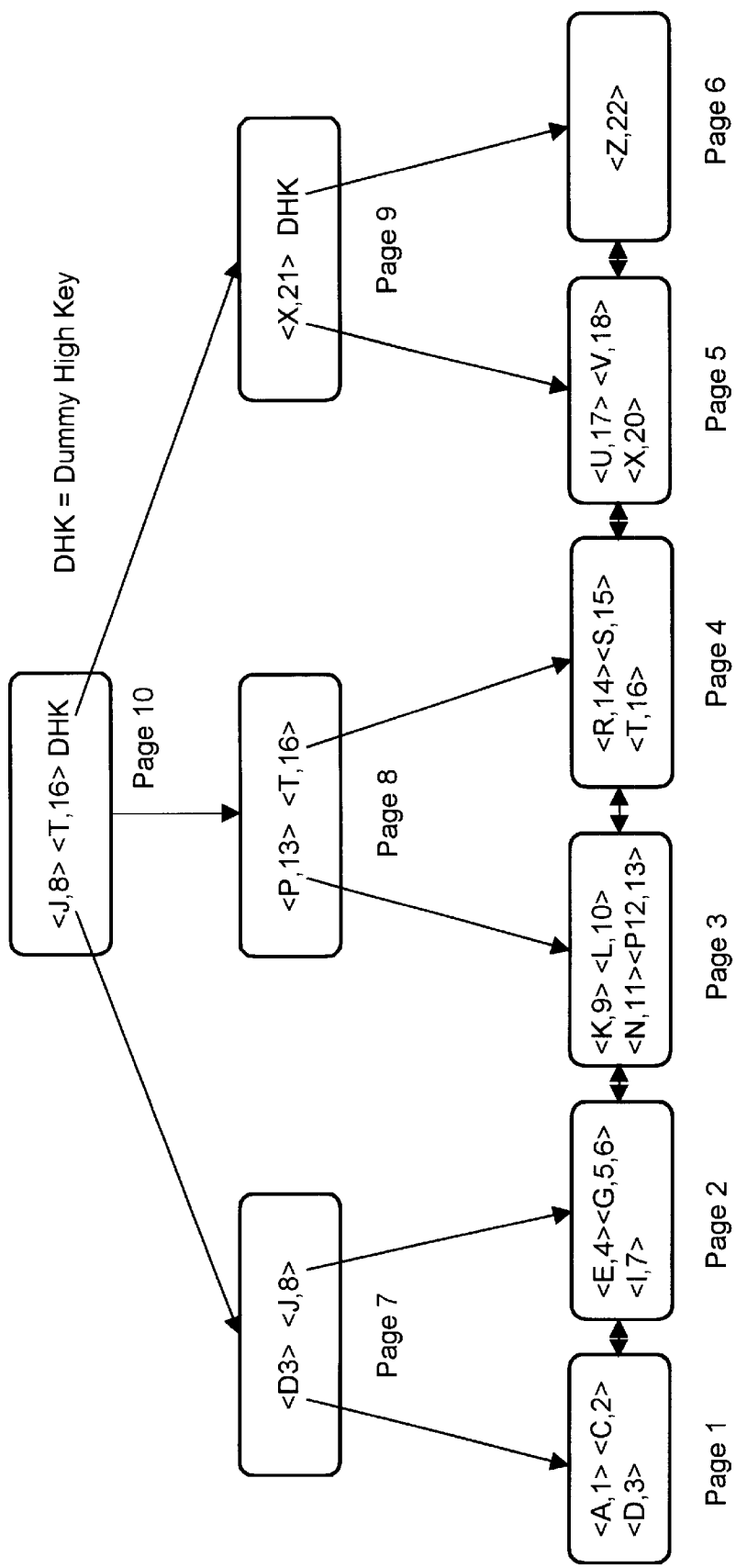

Referring to FIG. 17 there is illustrated a B-tree index according to the prior art, which B-tree index is subjected to a reverse range scan. Referring to FIG. 2, a start flow chart shows the initial settings of nine flags before a reverse scan begins. The flags used are a reverseScan flag, a prevIfNoMatch flag, an afterFirst flag, an exclusiveStartKey flag, an unlockNextKey flag, a lockNextKey flag, an endOfScan flag, a lockRow flag, and a currentRecordLocked flag. In step 30 the flags are initialized as follows:

(1) the reverseScan flag is set equal to true for a reverse scan and to false for a forward scan. When the reverseScan flag is true, the search automatically positions on the last RID for each key by using a modified binary search to get to the last RID for a particular key value, while if the reverseScan flag is false, the search automatically positions on the first RID for each key. This flag helps to increase the efficiency of the reverse scan as in a reverse scan, the search should position on the last RID for a searched key and scan backward from there for all of the other RIDs for that key. If a search positioned on the first RID for each key, it might be necessary for a search in a non-unique index to run through many pages of RIDs for the same key value before reaching the last RID, and then to scan backwards from there to return to where it started.

(2) for a reverse scan, the lockNextKey flag is set equal to true indicating that the boundary key still needs to be locked. After the boundary key is locked, the lockNextKey flag is set equal to false.

(3) the unlockNextKey flag is set equal to true when the boundary key needs to be unlocked (after a retry, say) and is set equal to false when there is no need to unlock the boundary key.

(4) the afterFirst flag is set equal to true if the first key in the range has already been found and locked. Otherwise, the afterFirst flag is set equal to false if the first key in the range has not already been found and locked.

(5) the endOfScan flag is set equal to true if the end of the scan has been reached—in that the scan has gone beyond the last key in the range (the lowest key in the index that is in the range). Otherwise, the endOfScan flag is set equal to false.

(6) when the prevIfNoMatch flag is set equal to false and the scan cannot find the exact key on the page, then the next key will be returned, which next key designates the interval in which the exact key is found. When the search reaches a leaf page for a reverse scan, the prevIfNoMatch flag is set equal to true. In this setting, the search will return a previous key if the search cannot find the exact key on a page.

(7) the lockRow flag is set equal to true when a row is to be locked and is set equal to false when the row has already been locked.

(8) the exclusiveStartKey flag is set equal to true if the start key of the reverse range is exclusive.

(9) the currentRecordLocked flag is set equal to true when either the boundary key or a key in the range is locked.

Assume that the B-tree index of FIG. 17 is scanned for keys that are less than or equal to Q. Then in step 30, (1) the reverseScan flag is set equal to true as this is a reverse scan, and the search will automatically position on the last RID for each key. The lockNextKey flag is set equal to true indicating that the next key or boundary key still needs to be locked. The unlockNextKey flag is set equal to false as the boundary key does not need to be unlocked. The afterFirst flag is set equal to false as the first key in the range has not been found and locked. The endOfScan flag is set equal to false as the end of the scan has not been reached. The prevIfNoMatch flag is set equal to false as a leaf page has not yet been reached by the scan. The exclusiveStartKey is set equal to false as the start key of the reverse range is inclusive. The currentRecordLocked is set equal to false as no key in the index has been locked yet.

Figure 3:
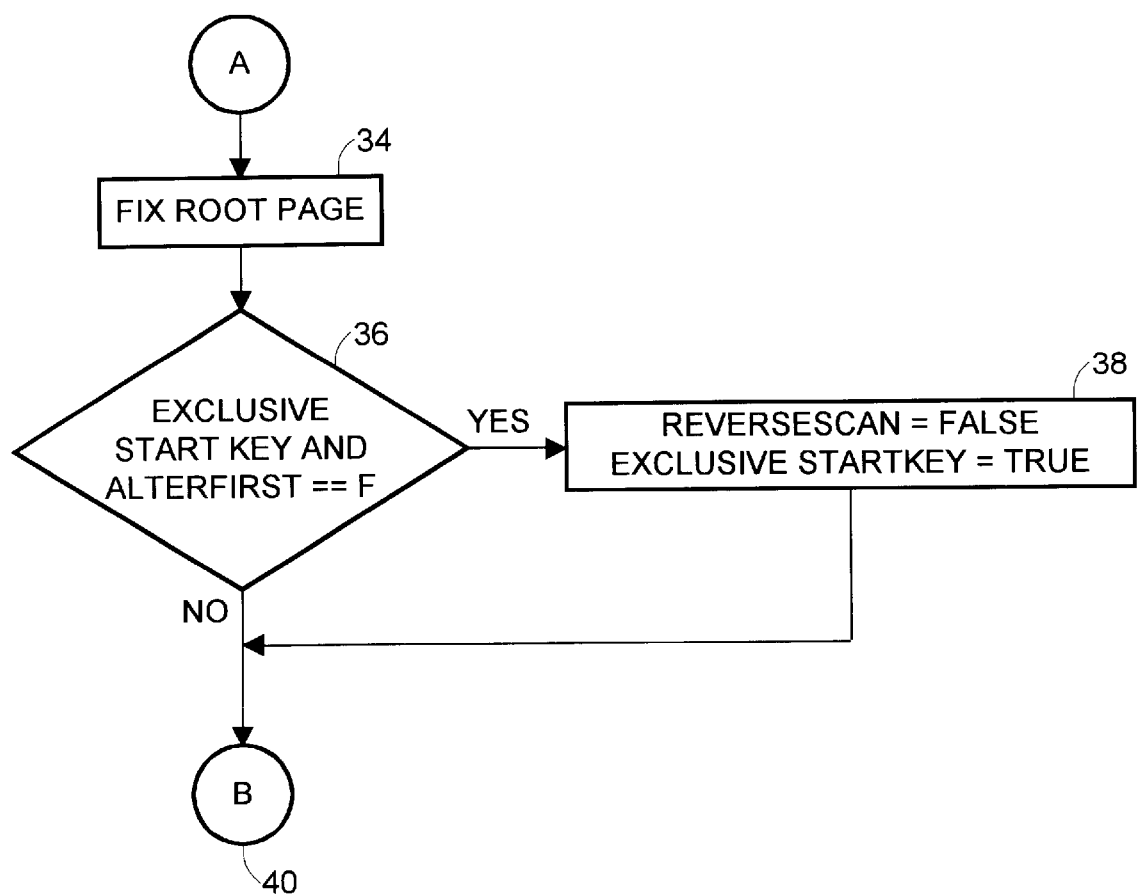
FIGS. 3 to 7 are flow charts showing boundary key locking aspects of the reverse range scanning process of FIG. 1.

FIG. 3 shows a flow chart A that follows the start flow chart. In step 34, root page 10 of the B-tree index of FIG. 17 is latched. Query 36 returns the answer "No" as the start key is inclusive. If the start key had been exclusive then, as the afterFirst key would have been equal to false as the first key in the reverse range had not yet been found, query 36 would have returned the answer "Yes" and step 38 would have been executed. In step 38, the reverseScan flag is set equal to false and the exclusiveStartKey is set equal to true. Recall that the reverseScan flag is initially set equal to true in order to render the search more efficient by positioning on the last RID of a key. Where the start key of a reverse range is an exclusive start key, however, it is more efficient to position on the first RID of this start key as this RID will provide the boundary as all RIDs to the left will be in the reverse range. This will not hold true if the search has already located the first key in the range, which is why Step 38 includes the second condition that the afterFirst key be equal to false. The flow chart of FIG. 3 then terminates at point B.

Figure 4:
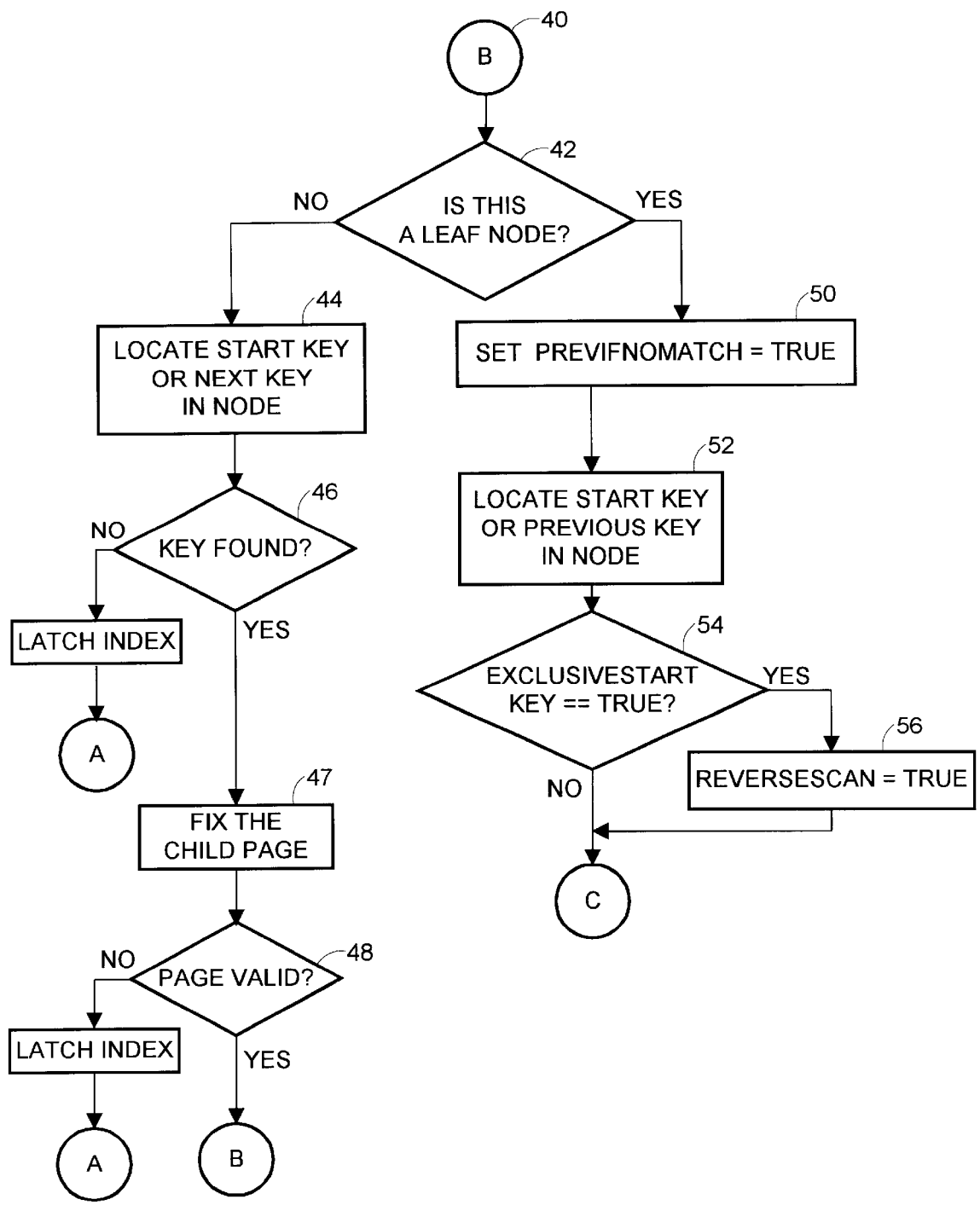

Flow chart B of FIG. 4 ends at one of A, B or C. After root page 10 of the B-tree index of FIG. 17 has been latched, query 42 of the flow chart of FIG. 4 returns the answer "No" as the root page or node is not a leaf node. The scan then proceeds to step 44, which determines the next higher key, key <T, 16>, as the start key is not on root page 10. The query of step 46 returns the answer "Yes" as key <T,16>has been determined. Key <T,16>points to child page 8, which page is latched in step 47, while an S latch is held on parent page 10. If page 8 is not valid, or no key can be returned from page 10, then the index is latched and the scan returns to the beginning of the flow chart of FIG. 3. Either of these situations might occur if a structural modification operation is occurring at the level of page 8, but is not yet reflected at the level of page 10. As page 8 of the B-tree of FIG. 17 is valid, the scan returns to the top of the flow chart of FIG. 4.

As page 8 is not a leaf page, the reverse scan will run through the flow chart along the same path previously taken. In step 44, key <T,16> will again be determined, and in step 47, child page 4, to which key <T,16> points, will be latched. The latch on page 8 will be held, but the latch on root page 10 will be released. As <T,16> is found on a valid page, the scan will return to B at the top of the flow chart of FIG. 4. This time, however, query 42 will return the answer "yes" as page 4 is a leaf page and the scan will accordingly proceed to step 50 where the flag prevIfNoMatch will be set equal to true as we are now at the leaf level and wish to scan to the left for the start key, instead of scanning to the right for a pointer to the correct child page as we do at non-leaf levels. The scan then searches for the start key or the previous key in the node in step 52. If the exclusiveStart key is equal to true, then the reverseScan flag will have been set equal to false back at step 38 of the flow chart of FIG. 3, and the scan will position on the first RID of the exclusive start key, if and when such key is found. If, as is the case in the present example, the start key is not an exclusive start key, the reverseScan flag will equal true and the scan will position on the last RID of the start key, if and when this key is found. After step 52, query 54 and, if the start key of the range is exclusive, step 56, the reverseScan flag will be set equal to true, regardless of whether the start key of the range is exclusive or not. The scan will then proceed to the flow chart beginning at C of FIG. 5.

In the reverse scan of the B-tree index of FIG. 17, we do not find the start key Q or a previous key on page 4. Accordingly, query 60 of the flow chart of FIG. 5 returns the answer "No" and the scan proceeds down the night hand side of the flow chart as shown to query 62, which returns the answer "No" as we have not hit the start of the index. In step 64, the scan requests a conditional latch on page 3, which is the previous page in the index. If the conditional latch is not granted, then via query 66 and step 68, the scan unlatches page 4 and latches the index in shared mode in order to serialize with any structural modification operations, and restarts the search from root page 10. If the conditional latch is granted, then, in step 70, the scan locates the last key on the previous page, locating, in this case, key <P,13> on page 3. This is the first time this point has been reached so, via query 72, the scan returns to point C at the top of this flow chart.

As we have found key <P,13>, this time through query 60 returns the answer "Yes". Query 74 then returns the answer "Yes" as <P,13> is in the reverse range defined by start key Q. As the currentRecordLocked flag was initially set equal to False and has not been changed, query 78 returns the answer "No" and directs the scan to point D at the top of the flow chart of FIG. 6. In the example scan of the B-tree of FIG. 17, no records are locked and the scan proceeds to D at the top of the flow chart of FIG. 6A. No records will be locked at this point as this is the first time through this portion of flow chart C. The scan must have proceeded through the flow charts of FIGS. 6 and 7, and been subsequently restarted in order for a record to have been locked.

Figure 6A:
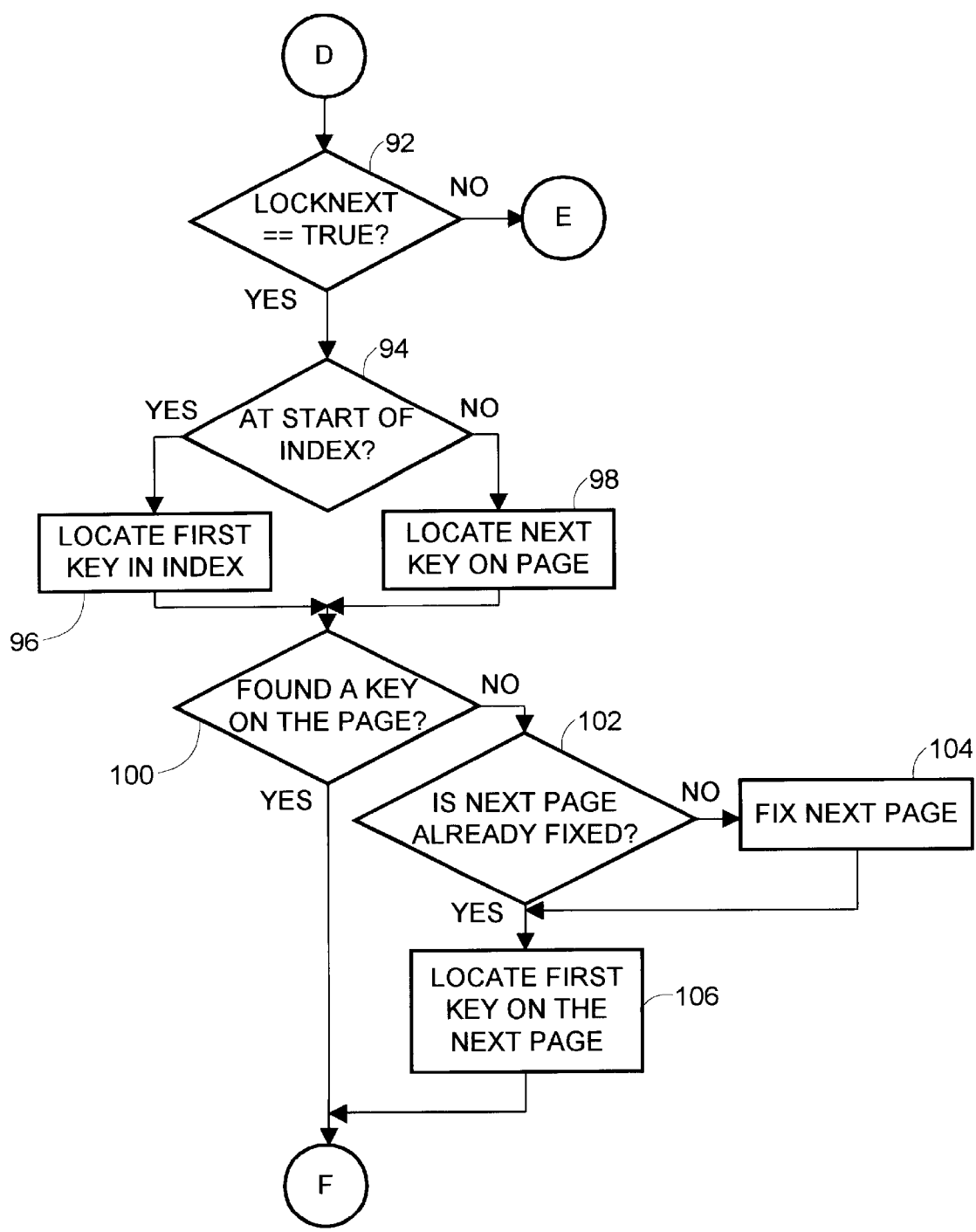

At the top of the flow chart of FIG. 6A, query 92 returns the answer "Yes" as the lockNext flag was initially set equal to true and the boundary key still needs to be locked. Query 94 returns the answer "No" as the key <P,13> is not at the start of the index. In step 98, the scan attempts to find the next key on page 3; however, as <P,13> is the last key on page 3, query 100 will return the answer "No". Query 102 then returns the answer "Yes" as the next page, page 4, has already been latched and key <R,14> is relocated on page 4 in step 106—if page 4 had not already been latched, this page would have been latched in step 104 before step 106 was executed.

Query 108 determines the isolation level, and if the isolation level is RR, a conditional request for an S medium-duration lock on key <R,14> will be made to the lock manager as indicated in step 112. If, on the other hand, the isolation level is not RR, a conditional request for an instant lock on key <R, 14> will be made to the lock manager as indicated in step 110. If page 3 had been the last page in the index, and key <P,13> were, accordingly, the highest key in the index, there would be no next key to lock and query 114 would return the answer "No". Then we would try and lock the end of the table conditionally as per step 118. As page 3 is not the last page in the index and a higher key, key <R,14>, is in the index, query 114 returns the answer "Yes" and we try to lock the RID for key <R,14> conditionally as per step 116. If a conditional lock is granted, query 120 returns the answer "yes" and the scan proceeds to query 121. If the reverse scan is an RR scan, then query 121 returns the answer "yes" and the lockNext flag is set equal to False before the scan proceeds to point E at the top of the flow chart of FIG. 7. This is because the lock is medium duration for an RR scan and, consequently, is held. If the reverse scan is not an RR scan, then we only get an instant lock on the boundary key and so must relock the next key if a retry is necessary. Accordingly, for a reverse scan that is not a RR scan, query 121 returns the answer "no" and the scan proceeds directly to point E at the top of the flow chart of FIG. 7 without executing step 119.

If, back at query 120, the conditional lock is not granted, then query 120 returns the answer "no" and pages 3 and 4 are unlocked, a medium S lock is requested unconditionally on the key <R,14>, and the currentRecordLocked is set equal to True as once the lock is granted, a record will be locked, while the unLockNext flag is set equal to True as it is the boundary key that must be unlocked. The scan then returns to point A to retry the search from the root page. The boundary key <R,14> is kept locked until a—possibly new—boundary key is located, at which time key <R,14> is unlocked and the—possibly new—boundary key is locked.

Figure 7:
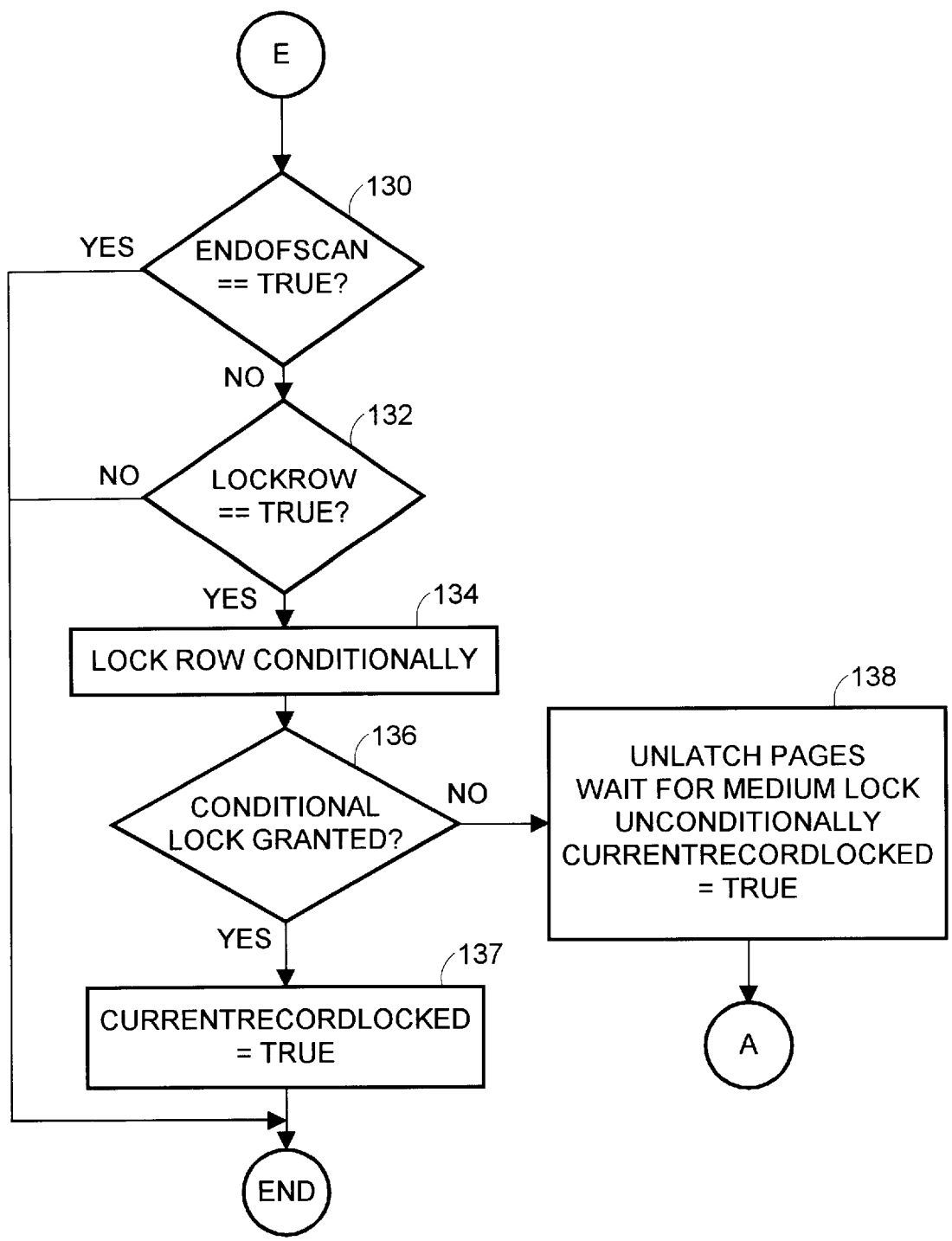

Assuming the boundary key has been successfully locked, query 120 returns the answer "yes" and the scan proceeds to point E at the top of the flow chart of FIG. 7. At that point we go on to lock the first key in the reverse range, <P,13>. To do this we must first check that the boundary key locked is not the first key in the index—if it is, then query 130 will return the answer "yes", indicating that the scan has ended, and no keys within the range will be locked. If query 130 returns the answer "no", then the scan proceeds to query 132, which checks the status of the lockRow flag. As this flag was initially set equal to true and has not been changed, this query returns the answer "yes" and the scan proceeds to step 134 in which a conditional request for a lock on row 13 is made. If there is no contention for this lock, then the row is locked and query 136 returns the answer "Yes". In step 137, the currentRecordLocked flag is set equal to True as we have just locked a key. If, on the other hand, there is contention for the lock on row 13, pages 3 and 4 are unlatched and an unconditional request for a lock on row 13 is made in step 138. The currentRecordLocked is also set equal to true to indicate that this key in the range has been locked. The scan then returns to point A.

The progression of the scan through the flow charts of FIGS. 3 and 4 following the return of the scan to point A from step 138 is similar to the initial progression of the scan through these flow charts. However, when query 60 returns the answer "Yes" and the scan proceeds down the left hand side of the flow chart of FIG. 5, a different path will be taken. Specifically, query 78 will now return the answer "yes" as row 13 has been locked. Query 80 will return the answer "No" as the unLockNext flag equals false. If the first key in the reverse range has changed for any reason, say because a new first key in the reverse range has been inserted, then query 84 will return the answer "No" and the scan will proceed to step 90, where the row will be unlocked and the currentRecordLocked flag set equal to false before the scan proceeds to point D. If the first key in the reverse range has not changed and the scan is re-locking the same key that has already been locked by step 138, then query 84 will return the answer "yes" and the lockRow flag will be set equal to false in step 86 before the scan proceeds back to point D, as there is no need to relock this row.

Figure 5:
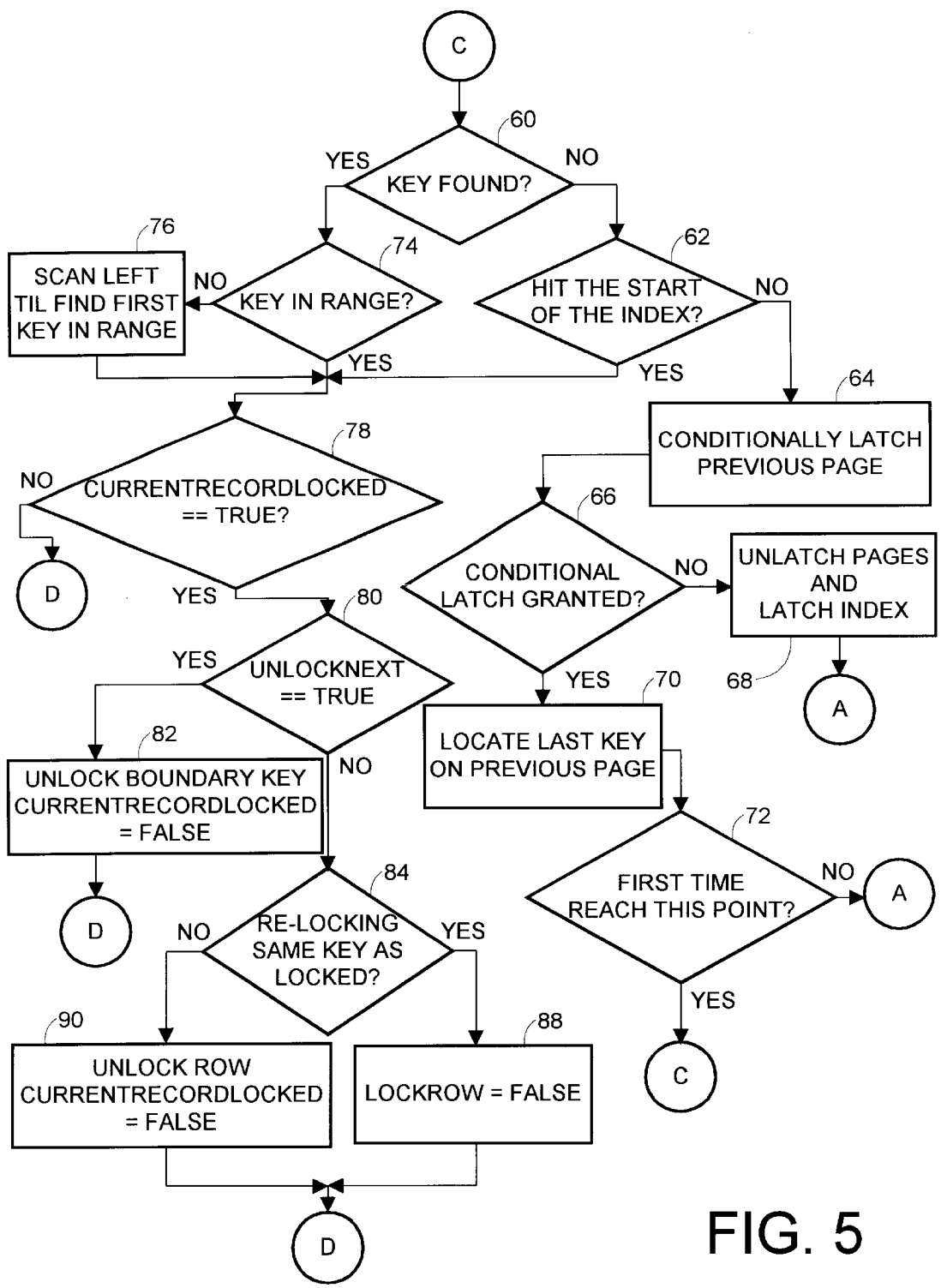
Figure 6B:
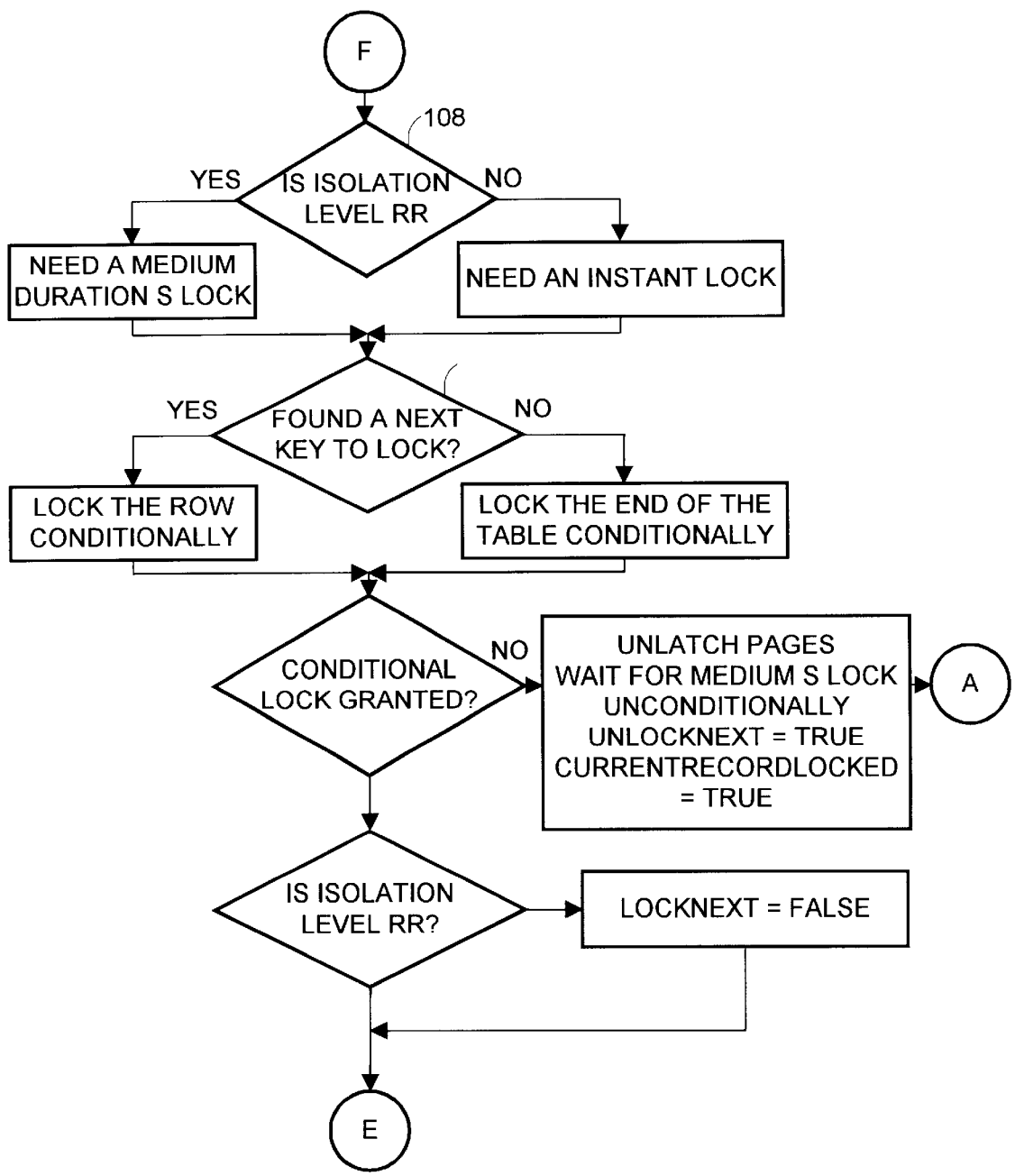

If there had been contention for a lock on the boundary key in the previous run through flow chart D of FIG. 6, then the scan would have proceeded back to point A via step 122, and the unLockNext flag would have been set equal to true in step 122. In that event, query 80 would have returned the answer "yes" on the next run through flow chart C of FIG. 5, the boundary key would have been unlocked in step 82 and the currentRecordLocked flag set equal to false before the scan proceeded to point D.

In the approach shown in FIGS. 4 to 6, a first key in a reverse range is first located, then a boundary key immediately to the right is located and locked, after which the first key in the range is found again and is locked this time. In the example shown, the first key in the range <P,13> is on a different page, page 3, then the boundary key <R,14>, which is on page 4. However, in that case the scan went from <P,13> on page 3 and moved to page 4 to find the boundary key. Accordingly, when the scan moves back to page 3 from page 4, page 3 is already latched and there is no problem with deadlatching resulting from interleaving with forward operations. However, as the scan moves backwards to page 2 the possibility of deadlatching resulting from interleaving with forward operations arises.

DEADLATCH PREVENTION

Figure 8:
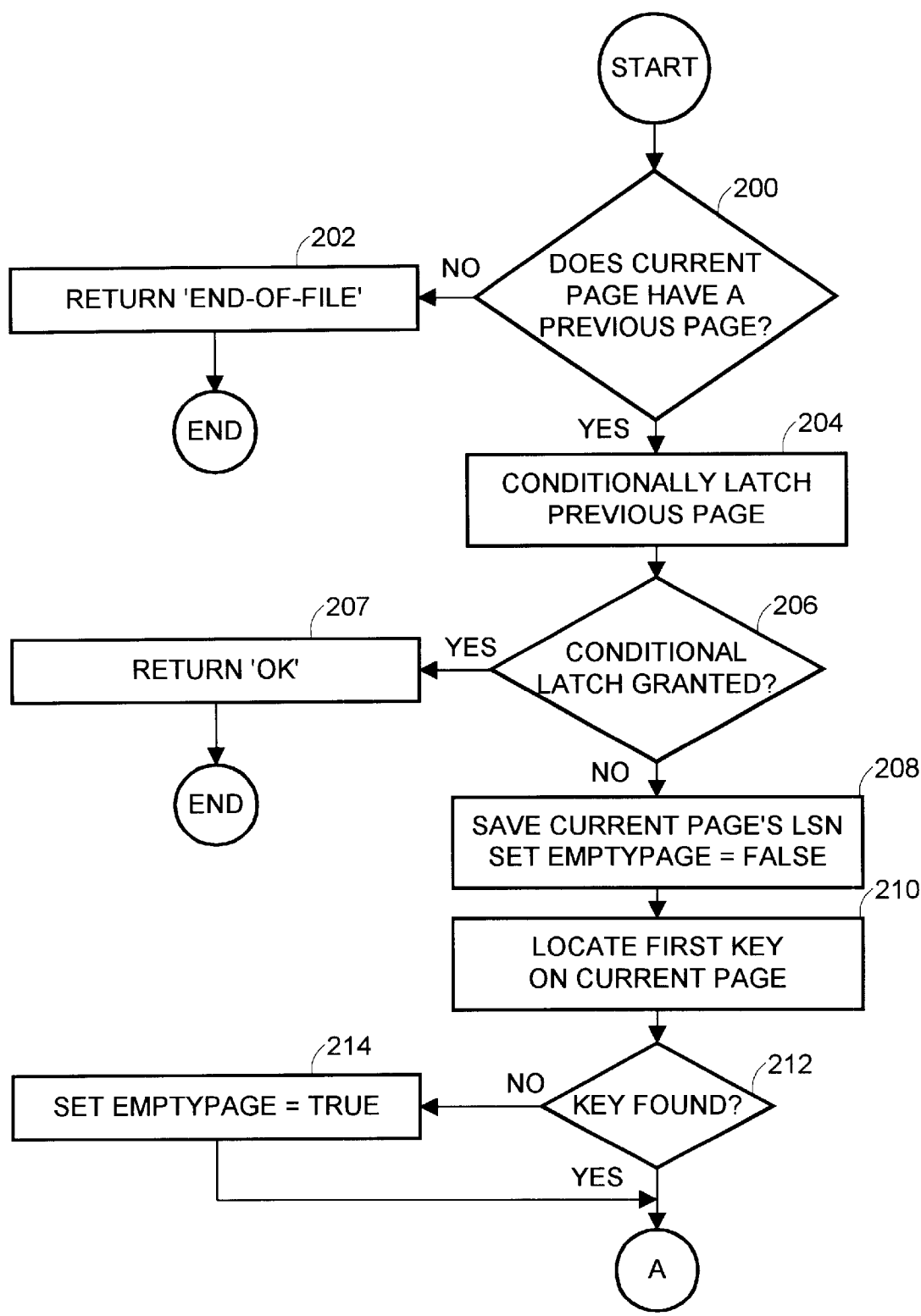
FIGS. 8 to 10 are flow charts showing deadlatch prevention aspects of a reverse range scanning process in accordance with an aspect of the invention.
Figure 9A:
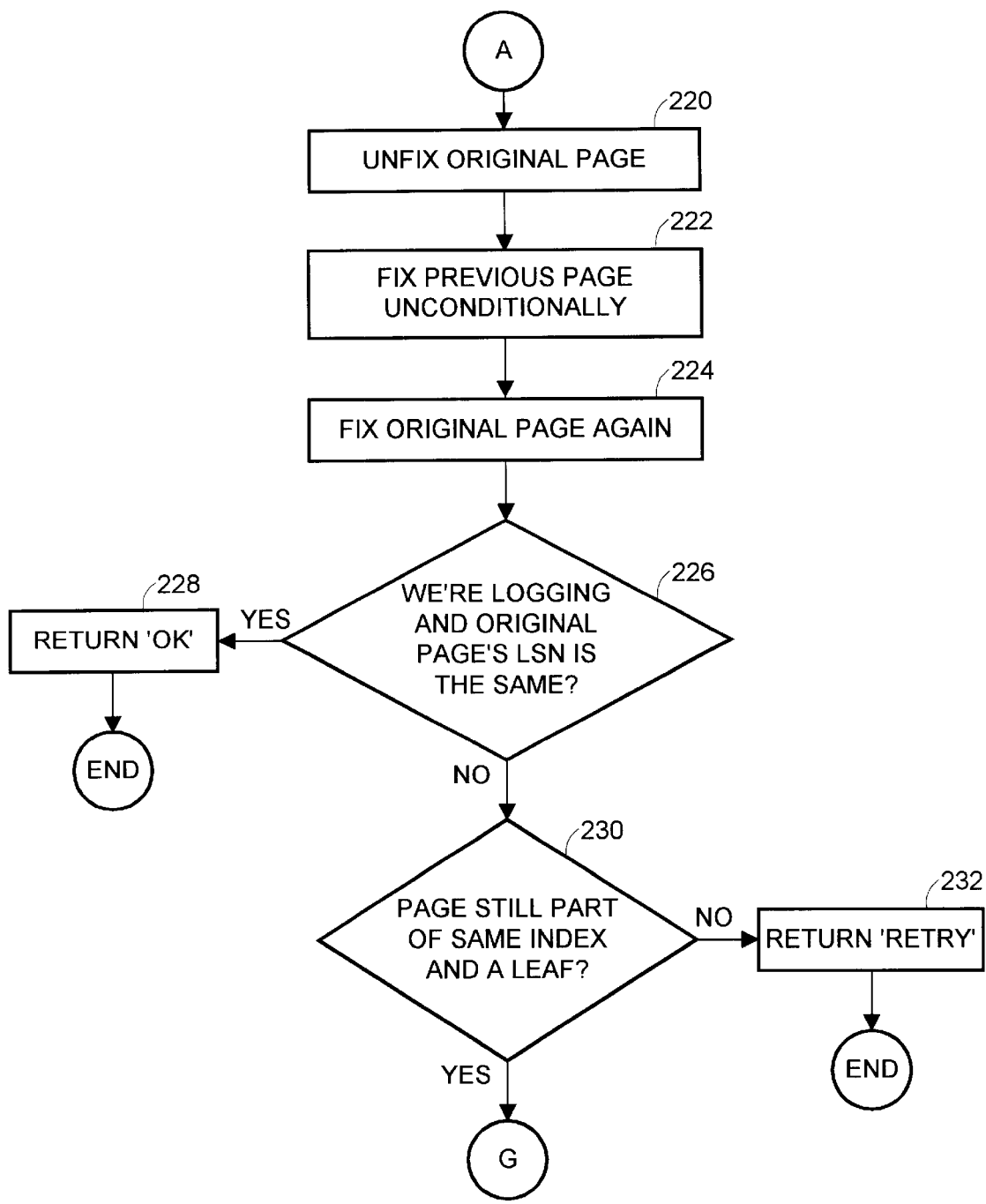
Figure 9B:
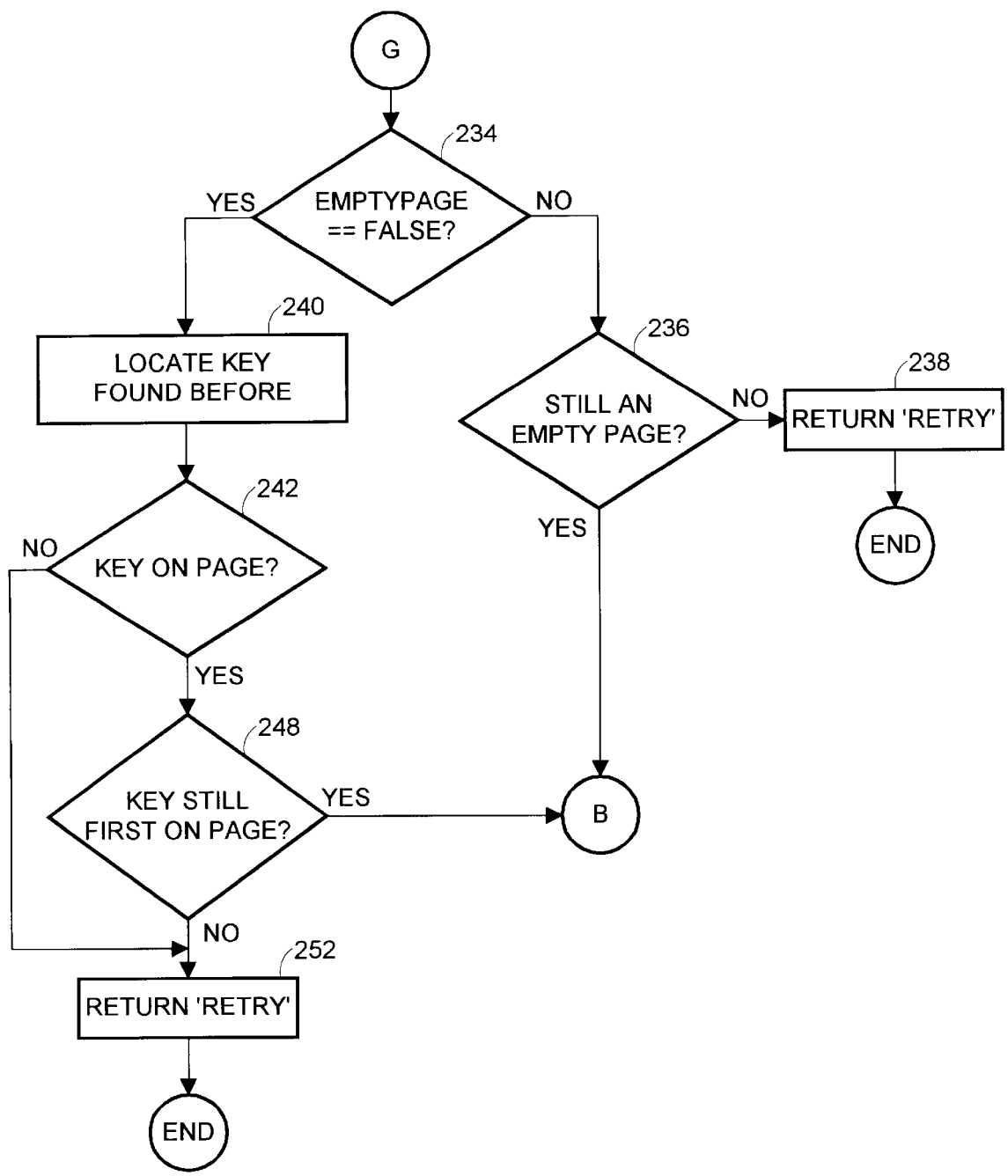
Figure 10:
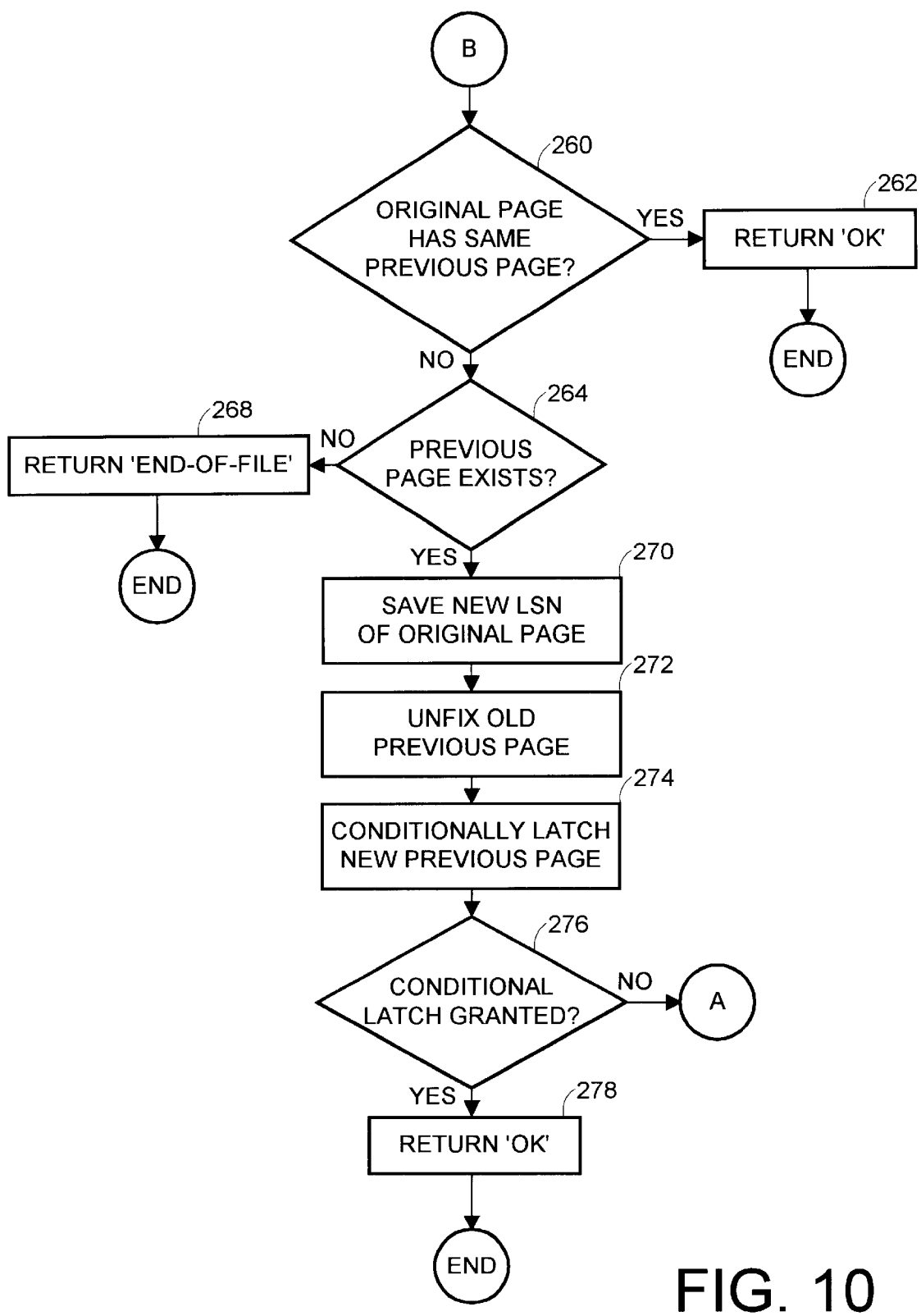

Referring to FIGS. 8 to 10, flowcharts show deadlatch prevention aspects of a reverse range scanning process in accordance with an aspect of the invention. In reverse scanning, the scan will be moving back through the pages from right to left as the scan searches for a first key in the range, or searches back for previous keys in the range from the first key in the range.

Whenever the scan moves to the previous page, it must keep the current page latched while the previous page is being found and latched. Database management systems, however, typically prevent deadlatching between pages by always latching pages from left to right. Accordingly, if pages are latched from right to left in a reverse scan, deadlatching with forward-operating transactions that latch pages from left to right must be prevented. Tables 12 and 13 shows how deadlatching may be caused by a reverse scan encountering a transaction performing a page delete.

TABLE 12

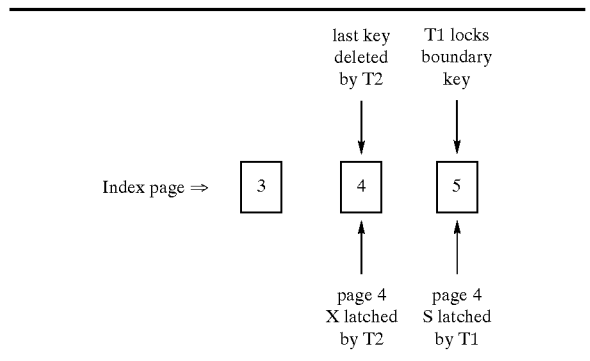

Transaction 1 (T1) is performing a scan and has page 5 latched in order to lock the boundary key, which happens to be the first key on the page. Transaction 2 (T2) has just deleted the single remaining key on page 4, so page 4 is latched exclusively.

TABLE 13

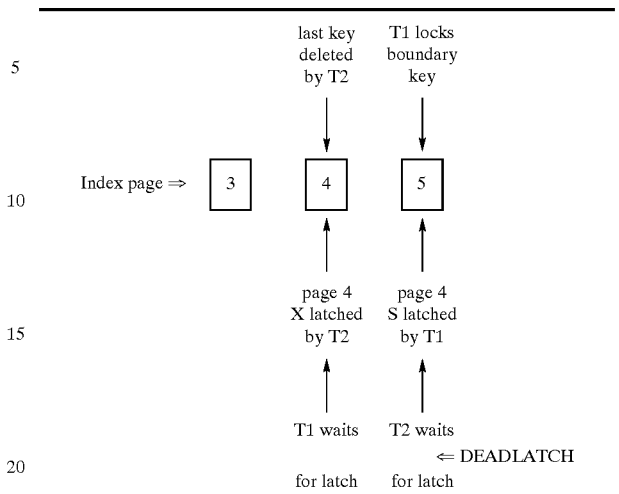

T2 deletes page 4 and needs to latch page 5 to update its previous pointer to now point to page 3, but has to wait on the page 5 lock held by T1. T1, on the other hand, wants to latch page 4 in share mode in order to find the first key in the scan, but has to wait for the lock held by T2. This creates a deadlatch situation.

Deadlatch prevention becomes imperative when the scan is moving from a current page to a previous page. Referring to FIG. 8, query 200 returns the answer "No" when the current page has no previous page. Step 202 then indicates that the end of the file has been reached and the reverse scan terminates. If, on the other hand, query 200 returns the answer "Yes", then a conditional request for a latch on the previous page is made in step 204. If the latch on the previous page is granted, query 206 returns the answer "Yes", and the scan returns the answer "Okay" in step 207. If, on the other hand, the conditional latch is not granted, query 206 returns the answer "No" and the current page's log sequence number is saved in step 208. The emptyPage flag is set equal to False in step 208. In step 210, the scan searches for the first key on the current page. If the first key on the current page is found, query 212 returns the answer "Yes" and the scan proceeds to Point A at the top of the flowchart of FIG. 9A. If, on the other hand, query 212 returns the answer "No", the flag emptyPage is set equal to true and the scan again proceeds to point A at the top of the flowchart of FIG. 9A.

Referring to FIG. 9A, in step 220 the current page is unlatched, following which an unconditional request for a latch on the previous page is made in step 222. This combination of a conditional request for a latch on the previous page first being made, followed by an unconditional request for such latch after the original page has been unlatched if the conditional request for a latch is not granted, is made in order to prevent the deadlatch situation illustrated in Table 12 above. Specifically, the deadlatch prevention procedure first checks if the previous page is incompatibly latched by another transaction. If the page is not already incompatibly latched by another transaction, then a latch is granted on the page. If, on the other hand, there is contention for the previous page, we allow the other transaction to proceed. When the unconditional request for a latch on the previous page is granted, the current page is re-latched. If the log sequence number of the current page has changed, we check that the page is still part of the index and that either the first key on the page has not changed, or if the page was empty, that it is still empty. If any of these conditions fail, we re-probe, searching for start key of the range from the root page of the index.

Figure 14A:
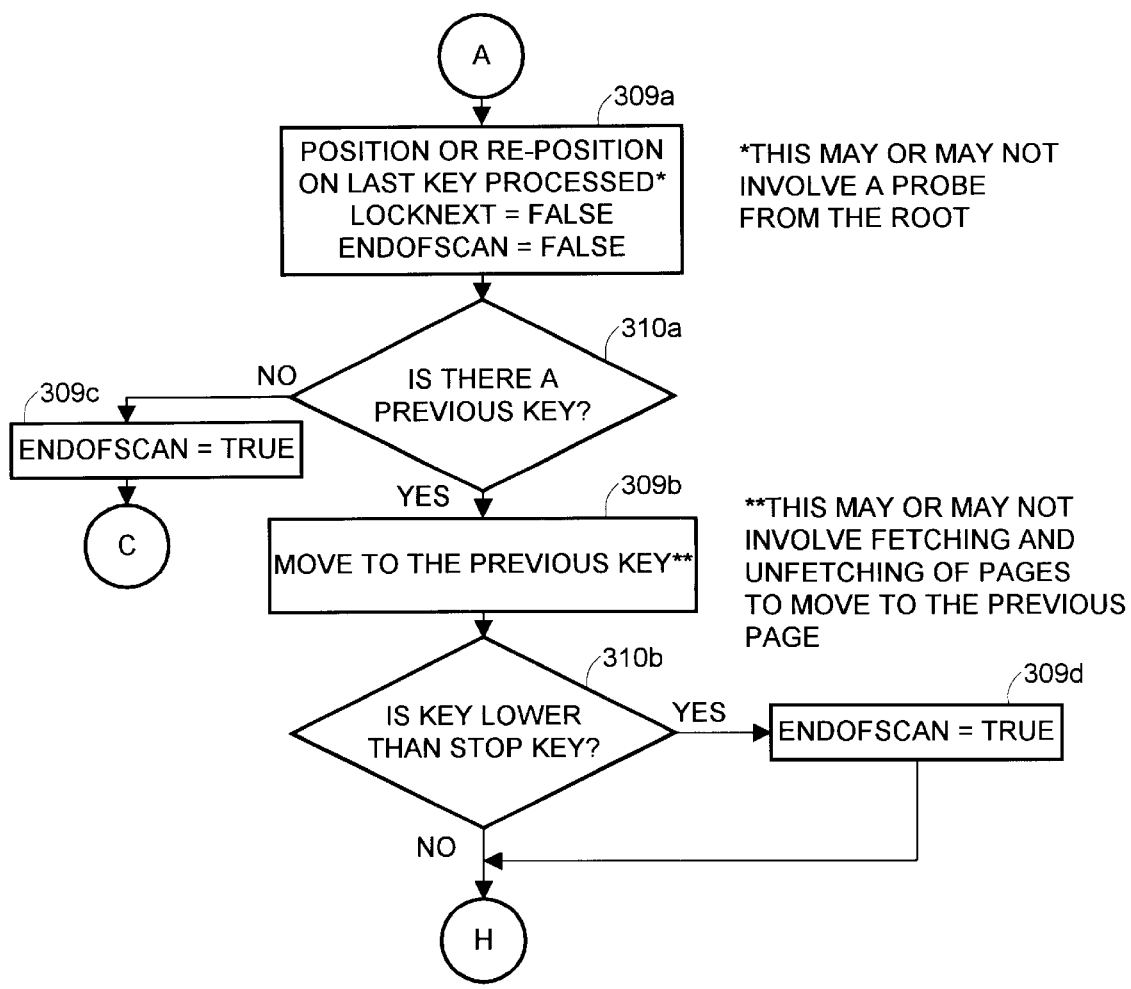
Figure 14B:
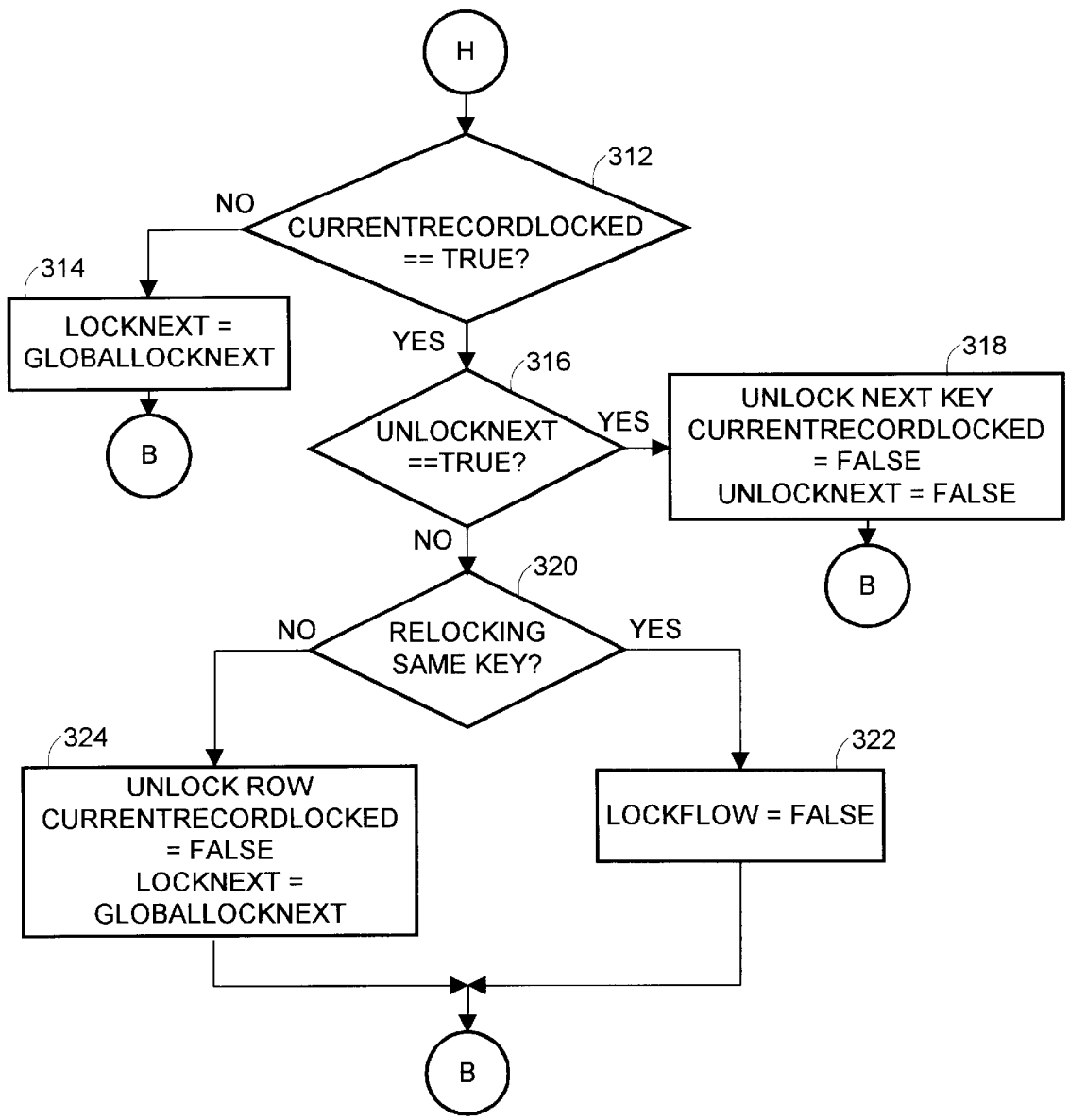

Returning to the flowchart of FIG. 9A, after the previous page has been latched in step 222, and the original page is latched again in step 224, query 226 returns the answer "Yes" if the original page's log sequence number remains unchanged. At that point, step 228 will return the answer "Ok", as the original page has not changed since it was first latched and the process of moving to a previous page without causing deadlatching has been successfully achieved. If, on the other hand, query 226 returns the answer "No" because the original page's log sequence number has changed, step 230 queries whether the original page is still part of the same index, and is still a leaf page. If query 230 returns the answer "No" the deadlatch prevention process proceeds to step 232 and retries to get the next key in the range (see step 310 of FIG. 14A). If, on the other hand, the original page remains a leaf page in the same index, query 230 returns the answer "Yes" and the deadlatch prevention process proceeds to query 234.

Recall that in step 214, the emptyPage flag was set equal to true if a key was not located on the current page in step 210. Query 234 returns the answer "No" if the emptyPage flag equals true. Query 236 then returns the answer "Yes" if the current page remains an empty page, and the deadlatch prevention procedure proceeds to point B at the top of the flowchart of FIG. 10, as the current page has not been changed. If, on the other hand, the current page is no longer an empty page, query 236 returns the answer "No" and the deadlatch prevention procedure proceeds to step 232 and retries to get the next key in the range (see step 310 of FIG. 14A).

If query 234 returns the answer "Yes" as a first key was located on the current page back at step 210, then this former first key is searched for again in step 240. If this key is found, query 242 returns the answer "Yes" and the procedure goes to query 248, which returns the answer "Yes" if this key is still the first on the page. The deadlatch prevention procedure will then proceed to Point B at the top of FIG. 10 as the changes made to the current page will not interfere with the process of moving to the previous page. If, on the other hand, query 248 returns the answer "No" then in step 252, the deadlatch prevention procedure will retry from the beginning.

If query 242 returns the answer "No" as the key previously found is no longer on the page, then the deadlatch prevention procedure goes directly to step 252, bypassing step 248, where the procedure is restarted.

Referring to FIG. 10, query 260 returns the answer "Yes" if the original page has the same previous page as at step 204. In that event, step 262 returns "Okay". If, on the other hand, the previous page of the original page has changed, then query 264 returns the answer "No" and the process goes to query 264. If the previous page no longer exists, step 268 returns "End-of-File" and the reverse scan terminates. If, on the other hand, query 264 returns the answer "Yes", then a new log sequence number of the original page is saved in step 270. The prior previous page is then unlatched in step 272, and a conditional request for a latch on the new previous page is made in step 274. If the conditional latch is granted, then a query 276 returns the answer "Yes" at which point step 278 returns "Okay". If, on the other hand, query 276 returns the answer "No", then the conditional latch has not been granted and the deadlatch prevention procedure returns to Point A at the top of the flowchart of FIG. 9A.

Referring to FIGS. 11A and 11B, the various steps and queries of the flowcharts of FIGS. 8 to 10 are represented in pseudo code. In FIGS. 12A–12D, the various steps and queries of the flowcharts of FIGS. 2 to 7 are represented in pseudo code.

FIND NEXT OPERATION

Figure 13:
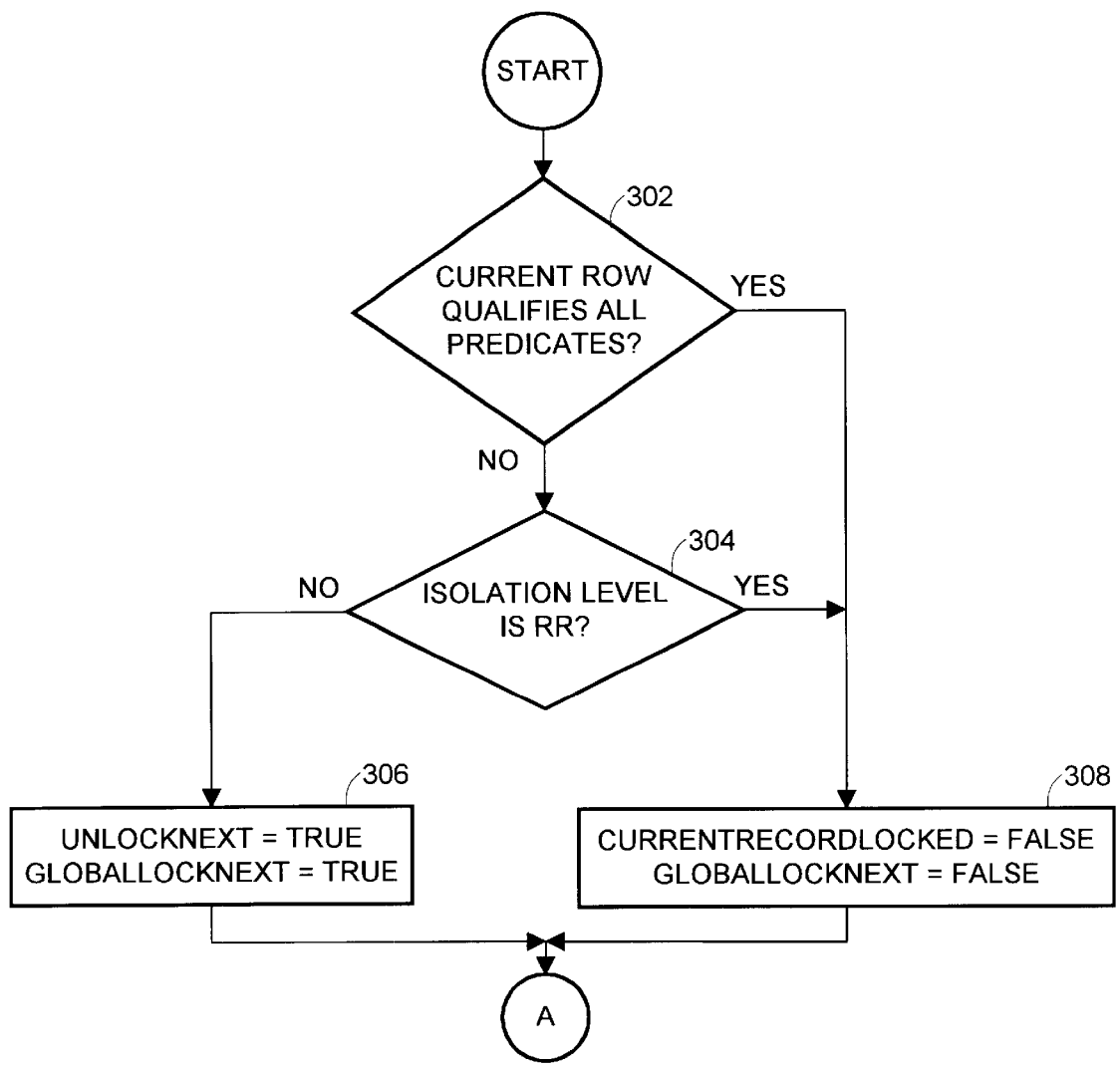
FIGS. 13 to 16 are flow charts showing a find next operation of a reverse range scanning process in accordance with an aspect of the invention; and, FIG. 17 shows a B-tree index according to the prior art.

After the boundary key locking procedure illustrated in the flowcharts of FIGS. 2 to 8 has been completed, the actual reverse scan starts at Start 300 of FIG. 13. FIGS. 13 to 16 are flowcharts showing a fetch next operation. The fetch next operation fetches the next key in the reverse range, which is a previous key in the index.

Assume that the B-Tree index of FIG. 17 is scanned for key values that are less than or equal to Q, and that are not equal to N. Then query 302 will return the answer "Yes" as the current row, row 13, designated by current key <P,13>, is currently locked when the find next operation starts for the first time after the boundary key, key <R,14>. Since key <P,13> is within the reverse ranges and satisfies the search criteria not equal to N, the key should be returned in the result set and should thus be kept locked for the duration of the reverse scan. In step 308, the currentRecordLocked flag is set equal to False, so that the record will not be subsequently unlocked. The globalLockNext flag is also set equal to False. The reverse scan then proceeds to point A" at the top of the flowchart of FIG. 14A.

In step 309a, we probe from the root node, using latch coupling and the above-described right-biased binary searching patterns for reverse scans (see the foregoing discussion in connection with the reverseScan flag), to again find the last key that was found in the range, namely <P, 13>. The lockNext flag and endOfScan flags are also set equal to False in step 309a. Query 310a returns the answer "Yes" as there is a previous key and the find next operation positions or repositions on the previous key <P, 12> in step 309b. Query 310b returns the answer "No" as there is no stop key, and the find next operation proceeds to query 312. As the currentRecordLocked was set equal to False in step 308, query 312 returns the answer "No" and the find next operation proceeds to step 314, in which the lockNext flag is set equal to the truth value of the globalLockNext flag; in this case the lockNext flag is set equal to False as the globalLockNext flag was set equal to False in step 308. The find next operation then proceeds to point B" at the top of the flowchart of FIG. 15A. Query 326 of the flowchart of FIG. 15A returns the answer "No" as the lockNext flag was set equal to False in step 314, and the find next operation accordingly proceeds to point C" at the top of the flowchart of FIG. 16.

Query 354 return the answer "No" as key <P, 12> is not at the end of the scan. If key <P, 12> had been at the end of the scan, query 354 would have returned the answer "Yes" and the reverse scanning procedure of the flowcharts of FIGS. 13 to 16 would have ended. As query 354 returned the answer "No", the find next operation proceeds to query 356. As the initial truth value of the lockRow flag was true, and has not been changed, query 356 returns the answer "Yes" and a conditional request for a lock against key <P, 12> is made in step 358. If the lock is granted, query 360 returns the answer "Yes" and in step 364 the currentRecord flag is set equal to true and the find next operation ends. If the conditional request for a lock on key <P, 12> made in step 358 is denied, then query 360 returns the answer "No" and the find next operation proceeds to step 362 in which pages 3 and 4 are unlatched, and the find next operation waits for a medium NS lock on key <P, 12> unconditionally. The currentRecordLocked is also set equal to True in step 362, as the key will be locked. When the lock is granted on key <P, 12>, the find next operation proceeds to point A" at the top of the flowchart of FIG. 14A.

In step 309a, the find next operation searches again for key <P, 13> and, once this key is found, repositions again on key <P, 12> in step 309b, assuming a new previous key, such as key <P,12.5> (assuming such a key is possible), has not been inserted while page 3 was unlatched. The LockNext flag is set equal to False. Query 312 returns the answer "Yes" as the currentRecordLocked flag was set equal to True in step 362. Query 316 then returns the answer "No" as the unlockNext flag was initially set equal to False and was never changed. The find next operation then proceeds to query 320, which returns the answer "Yes" if the previous key is still <P, 12>, at which point the find next operation will proceed to step 322 in which the lockRow flag will set equal to False before the find next operation proceeds to point B" at the top of the flowchart of FIG. 15A. If, on the other hand, a new previous key (say key <P, 12.5> mentioned above) has been inserted, the operation unlocks key <P, 12> and sets the currentRecord flag equal to False since no values are now locked. The lockNext flag is set equal to the truth value of the globalLockNext flag, which truth value is False, and the find next operation proceeds to point B" at the top of the flowchart of FIG. 15A.

Figure 16:
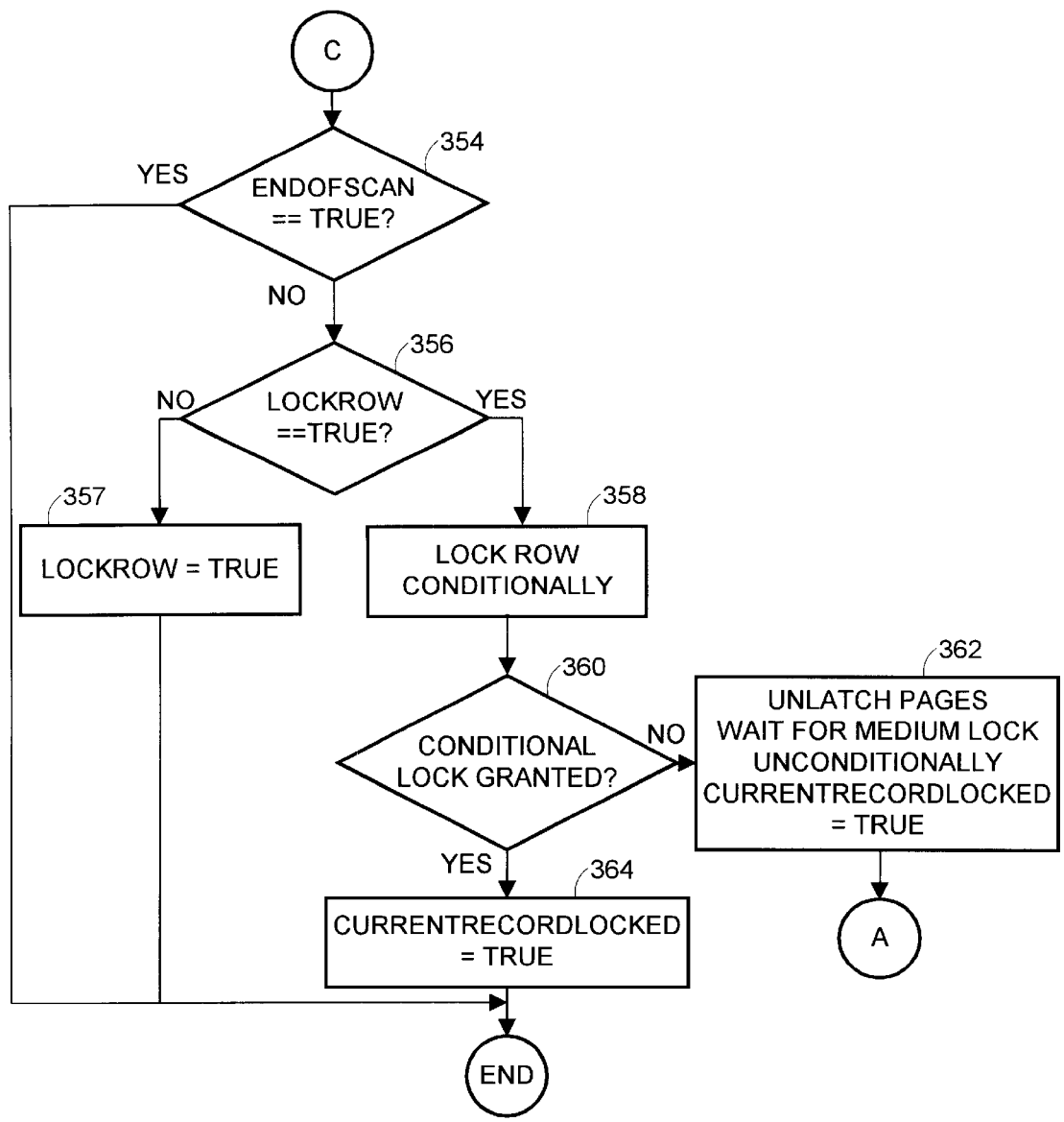

Query 326 returns the answer "No" as the lockNext flag was set equal to False in step 324, and the findNext operation proceeds to point C" at the top of the flowchart of FIG. 16. Query 354 returns the answer "No" as key <P, 12> is not at the end of the scan. Then, query 356 returns the answer "No", as the lockRow was set equal to False in step 322, and the lockRow flag is set equal to True in step 357 before the find next operation ends.

After returning the second qualifying key in the range, key <P, 12>, we continue with another find next operation. In the next run, key <P, 12> is the current key and key <N, 11> is the previous key, and the operation proceeds in much the same way as in the first run. However, there are differences in the succeeding find next operation in which key <N, 11> is the current key.

At the beginning of this find next operation, query 302 of the flowchart of FIG. 13 returns the answer "No" as the key <N, 11> does not satisfy the condition "not equal to N". The find next operation then proceeds to query 304 which returns the answer "Yes" if the reverse scan is at an RR isolation level. If so, then the find next operation will proceed to step 308 and follow much the same path as was done for Key <P, 12>. If, however, the isolation level is not RR, then query 304 will return the answer "No" and step 306 will set the unlockNext flag equal to true and the globalLockNext flag equal to true. In the following description of the find next operation through the flowcharts, it is assumed that the isolation level of the reverse scan is CS or RS, and not RR.

By setting the unlockNext flag equal to true, we ensure that we will unlock key <N, 11 > after finding the previous key in the range but after positioning on the previous key. By setting the globalLockNext flag equal to true, we ensure that if we have to re-probe in this operation for whatever reason, we will get an instant lock on that key's next key in order to protect us from missing an uncommitted delete that might be rolled back.

More specifically, in steps 309a and 309b we position on key <L, 10>, and the lockNext flag is set equal to False. Query 312 returns the answer "Yes" as the currentRecord-Locked flag is set equal to True as True is the initial setting of this flag and it has not been changed thus far in the operation. Query 316 then returns the answer "Yes", as in step 306 the unlockNext flag was set equal to True. In step 318, the next key, key <N, 11> is unlocked, the currentRecordLocked flag is set equal to False, and the unlockNext flag is set equal to False. The find next operation then proceeds to point B" at the top of the flowchart of FIG. 15A.

Figure 15A:
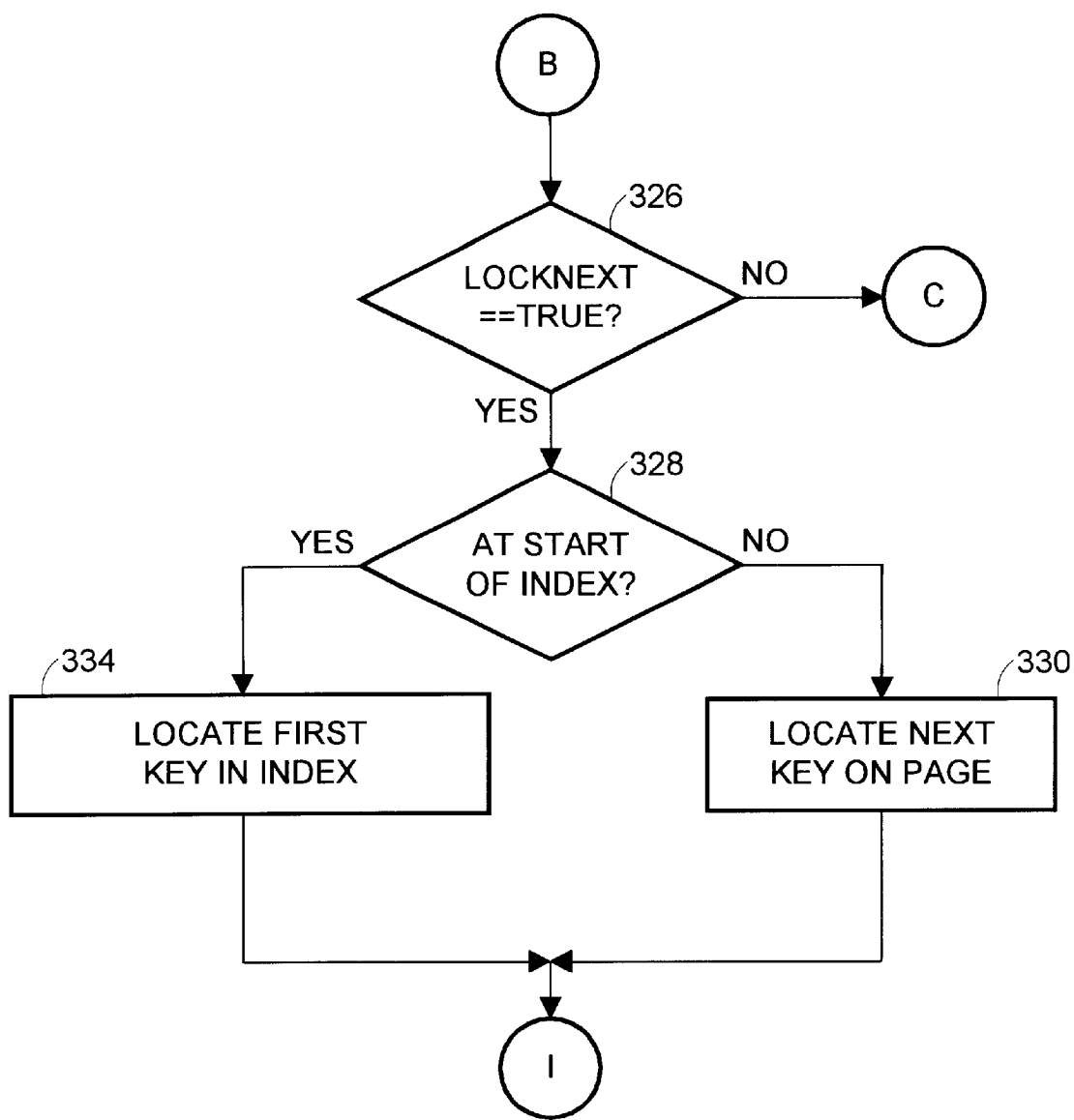
Figure 15B:
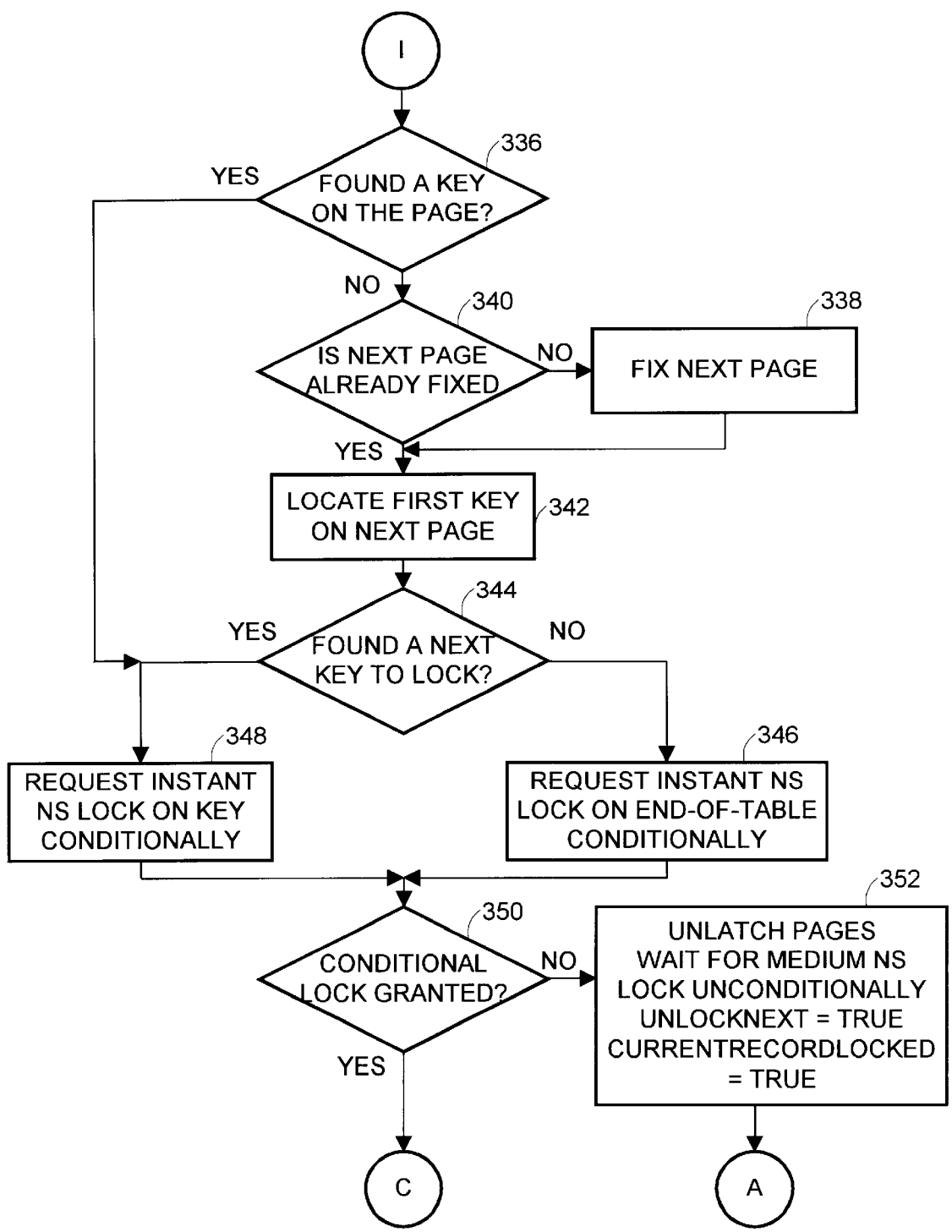

Query 326 of the flowchart of FIG. 15 returns the answer "No" as the lockNext flag was set equal to false in step 310, and the find next operation proceeds to point C at the top of the flow chart of FIG. 16, and attempts to lock key <L, 10> conditionally in step 358. If the operation is successful, then key <L, 10> is returned by the reverse scan and this find next operation is complete. If the conditional request for a lock on key <L, 10> is denied, then query 360 directs the operation to step 362, at which step we unlatch pages 3 and 4, request and wait for a medium duration lock unconditionally and set the currentRecordLocked flag to be equal to True to ensure that we unlock this record again if necessary after we reposition in step 309a. We then re-probe from the root page to find key <N, 11>, as key <N, 11> was the last key found and handled successfully. In step 309b, we then move to the previous key for key <N, 11>. Query 312 returns the answer "Yes", as the currentRecordLocked flag was set equal to True in step 362, and query 316 returns the answer "No", as the unLockNext flag was set equal to False in step 318. The find next operation then proceeds to query 320. If key <L, 10> is still the previous key for key <N, 11>, then query 320 will return the answer "Yes" and in step 322 the lockRow flag will be set equal to False. Then, record 10 will simply be returned, and the find next operation will be complete. If, however, a new key, say key <M, 17>, has been inserted while the pages were unlatched, query 320 will return the answer "No", indicating that the operation is about to lock a different key than the one that was locked from the previous attempt. In this event, the operation proceeds to step 324 in which key <L, 10> is unlocked, the currentRecordLocked flag is set equal to False, and the lockNext flag is set equal to the truth value of the globalLockNext flag, which truth value is True as the globalLockNext flag was set equal to True in step 306. The operation then proceeds to point B" at the top of FIG. 15A.

Query 326 returns the answer "Yes" as the lockNext flag was set equal to True at step 324. Then, query 328 returns the answer "No" as we are not yet at the start of the index, and, in step 330, the next key on the page, key <N, 11> is located. Query 336 then returns the answer "Yes", query 344 returns the answer "Yes" and an instant NS lock on key <N, 11> is requested conditionally in step 348. If the conditional request for a lock is granted, query 350 returns the answer "Yes" and the operation proceeds to point C" at the top of the flowchart of FIG. 16, after which key <M, 17> is locked following the procedure of the flowchart of FIG. 16.

If, however, the conditional request for a lock on key <N, 11> in step 348 is denied, then query 350 will return the answer "No", and in step 352 we unlatch pages 3 and 4 and wait for a medium NS lock unconditionally on key <N, 11>. As it will be necessary to unlock key <N, 11> subsequently, we set the unlockNext flag and currentRecordLocked flags equal to True. Then we proceed to point A" at the top of the flowchart of FIG. 1. At step 309b, the operation once again positions on key <N, 11>'s previous key, key <M, 17>, again. As the currentRecordLocked and unlockNext flags were set equal to True, queries 312 and 316 direct the operation to step 318, in which key <N, 11> will be unlocked (and then relocked since lockNext equals True) before key <M, 17> is locked and returned by the operation (assuming that the conditional lock on key <M, 17> is granted this time).

The reverse scan is conducted by repeatedly executing the Find Next operation, by means of which the reverse scan proceeds back through pages 3, 2 and 1 of the example B-Tree of FIG. 17. The deadlatch prevention procedure that is described in the flowcharts of FIGS. 8 to 10 is adhered to as the reverse scan moves back from page 3 to 2, and from page 2 to 1. On page 1, when the current row is row 1, the Find Next operation will proceed as follows. Query 302 will return the answer "Yes" as key <A,1> satisfies the predefined search criteria not equal to N. The Find Next operation then proceeds to step 308 in which the currentRecordLocked flag and globalLockedNext flag are both set equal to false. The Find Next operation then proceeds to the flowchart of FIG. 14A. In step 309a of this flowchart, the Find Next operation repositions on key <A, 1> and the lockNext and endOfScan flags are set equal to False. Query 310a returns the answer "No" as there is no key preceding key <A, 1> in the index, and the Find Next operation accordingly proceeds to step 309c in which the endOfScan flag is set equal to True. The Find Next operation then proceeds to Point C" at the top of the flowchart of FIG. 16. Query 354 then returns the answer Yes as the endOfScan flag was set equal to True in step 309C and the Find Next operation terminates.

The present invention may be embodied in either specific forms without departing from the spirit or essential characteristics thereof. Certain adaptations and modifications of the invention will be obvious to those skilled in the art. Therefore, the presently discussed aspects are considered to be illustrative and not restrictive, the scope of the invention being indicated by the appended claims rather than the foregoing description, and all changes which come within the meaning of range of equivalency of the claims are therefore intended to be embraced therein.

What is claimed is:

1. In a data processing system, a method executed by a data processor for scanning a reverse range defined by a start key value, a scan being conducted in an index for a table having an upper end and a lower end, the index having a set of keys representing a set of records and record attributes in the table, wherein each key having a record identifier (RID) designating a record in the table and a key value corresponding to an attribute of the record in the table, the method comprising the steps of:

(a) searching the index for a start key having the start key value, wherein, if the start key value is exclusive, the start key is a lowest key in the index having the start key value and if the start key value is inclusive, the start key is a highest key in the index having the start key value;

(b) selecting an upper bound of the reverse range to be:
        (i) if the start key is in the index and is inclusive, the upper bound is the upper end of the index, when the start key value is a highest key value in the index, and, when not, the upper bound is a next higher key after the start key in the index;
        (ii) if the start key is in the index and is exclusive, the upper bound is the start key;
        (iii) if the start key is not in the index and the start key value is lower than a lowest key value in the index, the upper bound is a first key in the index; and
        (iv) if the start key is not in the index and the lowest key value in the index is less than the start key value, the upper bound is the upper end of the table, when the start key value is higher than a highest key value in the index, and, when not, the upper bound is a lowest key in the index having a key value exceeding the start key value;

(c) if the upper bound is the first key in the index, then indicating that the index does not contain any key values within the reverse range; and (d) if the upper bound is not the first key in the index, then fetching each key below the upper bound in the index.

2. The method of claim 1 wherein the index has a set of forward operations at a selected isolation level, the set of forward operations utilizing next higher key access restriction to maintain the selected isolation level, the method further comprising restricting access to the upper bound during scanning to preserve the selected isolation level.

3. The method of claim 2 further comprising:
    defining an upper internal boundary wherein:
        (i) the upper internal boundary is the start key, if the start key is in the index and is inclusive, and the upper internal boundary is the lower end of the table, if the start key value is lower than the lowest key value in the index or if the start key value is exclusive and is equal to the lowest key value in the index; and
        (ii) if the start key value is not in the index and is inclusive, the upper internal boundary is the highest key in the index having a key value lower than the start key value; and
    wherein step (b) comprises selecting the upper bound to be adjacent to and higher than the upper internal boundary.

4. The method of claim 3 wherein the step of restricting access to the upper bound comprises requesting a conditional access restriction on the upper bound and, if the conditional access restriction on (the upper bound is denied, then the method further comprising:
    (i) requesting an unconditional access restriction on the upper bound; and
    (ii) when the unconditional access restriction on the upper bound is granted, re-executing step (a) and the step of defining the upper internal boundary, then releasing the unconditional access restriction on the upper bound before re-executing the steps of:
        defining the upper bound; and
        restricting access to the upper bound.

5. The method of claim 4 wherein, if the isolation level is a repeatable read isolation level, the conditional access restriction and the unconditional access restriction are of medium duration to preserve the repeatable read isolation level throughout scanning of the reverse range, otherwise the conditional access restriction is of instant duration to test if access is permitted to the upper bound, and the unconditional access restriction is of medium duration to permit the upper internal boundary to be defined.

6. The method of claim 5 further comprising, after the conditional access restriction on the upper bound has been granted, restricting access to a first key in the range being the upper internal boundary if the upper internal boundary is not the lower end of the table.

7. The method or claim 6 wherein the step of restricting access to the first key in the range comprises requesting a conditional access restriction on the first key in the range, and, if the conditional access restriction on the first key in the range is denied, then the method further comprising:
    (i) requesting an unconditional access restriction on the first key in the range;
    (ii) when the unconditional access restriction on the first key in the range is granted, re-executing step (a) and the step or defining the upper internal boundary; and (iii) if the upper internal boundary has changed, then releasing the access restriction on the first key in the range;

re-executing step (b) using the upper internal boundary as changed;

re-executing the step of restricting access to the upper bound; and if the upper internal boundary as changed is not the lower end of the table, restricting access to a new first key in the range being the upper internal boundary as changed.

8. The method of claim 7 further comprising:

selecting a result set from the reverse range, each key in the result set being in the reverse range and satisfying a predefined search criteria;

if the upper bound is not the first key in the index, after fetching an $n^{th}$ key in the reverse range, searching for an $(n+1)^{th}$ key immediately preceding the $n^{th}$ key;

if the $(n+1)^{th}$ key in the reverse range is in the index, fetching the $(n+1)^{th}$ key; and if the $(n+1)^{th}$ key is not in the index, ending the scan.

9. The method of claim 8 wherein the reverse scan extends over a set of index pages in the index, the $n^{th}$ key being on a current page in the set of index pages, the method further comprising, if the $(n+1)^{th}$ key is on a previous page immediately preceding the current page in the set of index pages in the index, restricting access to the previous page before fetching the $(n+1)^{th}$ key.

10. The method of claim 9 wherein the step of restricting access to the previous page before fetching the $(n+1)^{th}$ key comprises requesting an initial conditional access restriction on the previous page and, if granted, fetching the $(n+1)^{th}$ key and, if denied, the method further comprising:

releasing the access restriction on the current page;

requesting an unconditional access restriction on the previous page; and when the unconditional access restriction on the previous page is granted, restricting access to the current page again.

11. The method of claim 10 wherein, if the conditional access restriction on the previous page is denied, the method further comprises before releasing the access restriction on the current page, identifying a first page key on the current page, and, after the unconditional access restriction on the previous page is granted and access to the current page has been restricted again, the method further comprising:

checking the current page for changes and if the current page has changed then;

checking the current page to determine if the first page key is still first on the current page; and if the first page key is not still first on the current page, releasing the access restriction on the previous page and searching for a new $(n+1)^{th}$ key immediately preceding the $n^{th}$ key.

12. The method of claim 8 further comprising after locating the $(n+1)^{th}$ key immediately preceding the $n^{th}$ key in the reverse range, requesting a conditional access restriction on the $(n+1)^{th}$ key before fetching the $(n+1)^{th}$ key, and if the conditional access restriction on the $(n+1)^{th}$ key is denied:

requesting an unconditional access restriction on the $(n+1)^{th}$ key;

after the unconditional access restriction on the $(n+1)^{th}$ key has been granted, searching for the $n^{th}$ key and positioning on a new $(n+1)^{th}$ key; and if the new $(n+1)^{th}$ key differs from the $(n+1)^{th}$ key, releasing the access restriction on the $(n+1)^{th}$ key, and obtaining an access restriction on the new $(n+1)^{th}$ key.

13. The method of claim 12 further comprising when the $n^{th}$ key in the reverse range contravenes the predefined search criteria and the selected isolation level is below a repeatable read isolation level:

after the $(n+1)^{th}$ key has been found and before access to the $(n+1)^{th}$ key has been restricted, releasing the access restriction on the $n^{th}$ key.

14. A computer program product for an application program for scanning a reverse range defined by a start key value, a scan being conducted in an index for a table having an upper end and a lower end, the index having a set of keys representing a set of records and record attributes in the table, wherein each key having a record identifier (RID) designating a record in the table and a key value corresponding to an attribute of the record in the table, the computer software product comprising:

a recording medium; and means recorded on the medium for instructing a computer to perform the steps of:

(a) searching the index for a start key having the start key value, wherein, if the start key value is exclusive, the start key is a lowest key in the index having the start key value and if the start key value is inclusive, the start key is a highest key in the index having the start key value; and (b) selecting an upper bound of the reverse range dependent on a start key position within the index.

15. The computer program product of claim 14, wherein, if the start key is in the index and is inclusive, the upper bound of the reverse range is the upper end of the index when the start key value is a highest key value in the index, and, when not, the upper bound is a next higher key after the start key in the index.

16. The computer program product of claim 14, wherein if the start key is in the index and is exclusive, the upper bound of the reverse range is the start key.

17. The computer program product of claim 14, wherein if the start key is not in the index and the start key value is lower than a lowest key value in the index, the upper bound of the reverse range is a first key in the index.

18. The computer program product of claim 14, wherein, if the start key is not in the index and the lowest key value in the index is less than the start key value, the upper bound of the reverse range is the upper end of the table when the start key value is higher than a highest key value in the index, and, when not, the upper bound is a lowest key in the index having a key value exceeding the start key value.

19. The computer program product of claim 14, further comprising indicating that the index does not contain any key values within the reverse range if the upper bound is the first key in the index.

20. The computer program product of claim 14, further comprising fetching each key below the upper bound in the index if the upper bound is not the first key in the index.

21. The computer program product of claim 14 wherein the index has a set of forward operations at a selected isolation level, the set of forward operations utilizing next higher key access restriction to maintain the selected isolation level, and the software product further comprises means for restricting access to the upper bound during scanning to preserve the selected isolation level.

22. The computer program product of claim 21 further comprising:

means for defining an upper internal boundary wherein:

(i) the upper internal boundary is the start key, if the start key is in the index and is inclusive, and the upper internal boundary is the lower end of the table, if the start key value is lower than the lowest key value in the index or if the start key value is exclusive and is equal to the lowest key value in the index; and (ii) if the start key value is not in the index and is inclusive, the upper internal boundary is the highest key in the index having a key value lower than the start key value; and wherein the means for selecting the upper bound of the reverse range is operable to select the upper bound to be adjacent to and higher than the upper internal boundary.

23. A data processing system for scanning a reverse range defined by a start key value, a scan being conducted in an index for a table having an upper end and a lower end, the index having a set of keys representing a set of records and record attributes in the table, wherein each key having a record identifier (RID) designating a record in the table and a key value corresponding to an attribute of the record in the table, the data processing system comprising means for performing the steps of:

(a) searching the index for a start key having the start key value, wherein, if the start key value is exclusive, the start key is a lowest key in the index having the start key value and if the start key value is inclusive, the start key is a highest key in the index having the start key value; and (b) selecting an upper bound of the reverse range dependent on a start key position within the index.

24. The data processing system of claim 23, wherein, if the start key is in the index and is inclusive, the upper bound of the reverse range is the upper end of the index when the start key value is a highest key value in the index, and, when not, the upper bound is a next higher key after the start key in the index.

25. The data processing system of claim 23, wherein if the start key is in the index and is exclusive, the upper bound of the reverse range is the start key.

26. The data processing system of claim 23, wherein if the start key is not in the index and the start key value is lower than a lowest key value in the index, the upper bound of the reverse range is a first key in the index.

27. The data processing system of claim 23, wherein, if the start key is not in the index and the lowest key value in the index is less than the start key value, the upper bound of the reverse range is the upper end of the table when the start key value is higher than a highest key value in the index, and, when not, the upper bound is a lowest key in the index having a key value exceeding the start key value.

28. The data processing system of claim 23, further comprising indicating that the index does not contain any key values within the reverse range if the upper bound is the first key in the index.

29. The data processing system of claim 23, further comprising fetching each key below the upper bound in the index if the upper bound is not the first key in the index.

30. The data processing system of claim 23 wherein the index has a set of forward operations at a selected isolation level, the set of forward operations utilizing next higher key access restriction to maintain the selected isolation level, and the data processing system further comprises means for restricting access to the upper bound during scanning to preserve the selected isolation level.

31. In a data processing system, a method executed by a data processor for scanning a reverse range defined by a start key value, a scan being conducted in an index for a table having an upper end and a lower end, the index having a set of keys representing a set of records and record attributes in the table, wherein each key having a record identifier (RID) designating a record in the table and a key value corresponding to an attribute of the record in the table, the data processing system comprising means for performing the steps of:

(a) searching the index for a start key having the start key value, wherein, if the start key value is exclusive, the start key is a lowest key in the index having the start key value and if the start key value is inclusive, the start key is a highest key in the index having the start key value; and (b) selecting an upper bound of the reverse range dependent on a start key position within the index.

32. The method of claim 31, wherein, if the start key is in the index and is inclusive, the upper bound of the reverse range is the upper end of the index when the start key value is a highest key value in the index, and, when not, the upper bound is a next higher key after the start key in the index.

33. The method of claim 31, wherein if the start key is in the index and is exclusive, the upper bound of the reverse range is the start key.

34. The method of claim 31, wherein if the start key is not in the index and the start key value is lower than a lowest key value in the index, the upper bound of the reverse range is a first key in the index.

35. The method of claim 31, wherein, if the start key is not in the index and the lowest key value in the index is less than the start key value, the upper bound of the reverse range is the upper end of the table when the start key value is higher than a highest key value in the index, and, when not, the upper bound is a lowest key in the index having a key value exceeding the start key value.

36. The method of claim 31, further comprising indicating that the index does not contain any key values within the reverse range if the upper bound is the first key in the index.

37. The method of claim 31, further comprising fetching each key below the upper bound in the index if the upper bound is not the first key in the index.

38. The method of claim 31 wherein the index has a set of forward operations at a selected isolation level, the set of forward operations utilizing next higher key access restriction to maintain the selected isolation level, the method further comprising restricting access to the upper bound during scanning to preserve the selected isolation level.

39. The method of claim 38 further comprising:
defining an upper internal boundary wherein:
(i) the upper internal boundary is the start key, if the start key is in the index and is inclusive, and the upper internal boundary is the lower end of the table, if the start key value is lower than the lowest key value in the index or if the start key value is exclusive and is equal to the lowest key value in the index; and (ii) if the start key value is not in the index and is inclusive, the upper internal boundary is the highest key in the index having a key value lower than the start key value; and wherein step (b) comprises selecting the upper bound to be adjacent to and higher than the upper internal boundary.

40. The method of claim 39 the step of restricting access to the upper bound comprises requesting a conditional access restriction on the upper bound and, if the conditional access restriction on the upper bound is denied, then the method further comprising:

(i) restricting an unconditional access restriction on the upper bound; and (ii) when the unconditional access restriction on the upper bound is granted, re-executing step (a) and the step of defining the upper internal boundary, then releasing the unconditional access restriction on the upper bound before re-executing the steps of:

defining the upper bound; and restricting access to the upper bound.

41. The method of claim 40 wherein, if the isolation level is a repeatable read isolation level, the conditional access restriction and the unconditional access restriction are of medium duration to preserve the repeatable read isolation level throughout scanning of the reverse range, otherwise the conditional access restriction is of instant duration to test if access is permitted to the upper bound, and the unconditional access restriction is of medium duration to permit the upper internal boundary to be defined.

42. The method of claim 41 further comprising, after the conditional access restriction on the upper bound has been granted, restricting access to a first key in the range being the upper internal boundary if the upper internal boundary is not the lower end of the table.

43. The method of claim 42 wherein the step of restricting access to the first key in the range comprises requesting a conditional access restriction on the first key in the range, and, if the conditional access restriction on the first key in the range is denied, then the method further comprising:

(i) requesting an unconditional access restriction on the first key in the range;

(ii) when the unconditional access restriction on the first key in the range is granted, re-executing step (a) and the step of defining the upper internal boundary; and (iii) if the upper internal boundary has changed, then
releasing the access restriction on the first key in the range;
re-executing stop (b) using the upper internal boundary as changed;
re-executing the step of restricting access to the upper bound; and
if the upper internal boundary as changed is not the lower end of the table, restricting access to a new first key in the range being the upper internal boundary as changed.

44. The method of claim 43 further comprising:

selecting a result set from the reverse range, each key in the result set being in the reverse range and satisfying a predefined search criteria;

if the upper bound is not the first key in the index, after fetching an $n^{th}$ key in the reverse range, searching for an $(n+1)^{th}$ key immediately preceding the $n^{th}$ key;

if the $(n+1)^{th}$ key in the reverse range is in the index, fetching the $(n+1)^{th}$ key; and, if the $(n+1)^{th}$ key is not in the index, ending the scan.

45. The method of claim 44 wherein the reverse scan extends over a set of index pages in the index, the $n^{th}$ key being on a current page in the set of index pages, the method further comprising, if the $(n+1)^{th}$ key is on a previous page immediately preceding the current page in the set of index pages in the index, restricting access to the previous page before fetching the $(n+1)^{th}$ boundary.

46. The method of claim 45 wherein the step of restricting access to the previous page before fetching the $(n+1)^{th}$ key comprises requesting an initial conditional access restriction on the previous page and, if granted, fetching the $(n+1)^{th}$ key and, if denied, the method further comprising:

releasing the access restriction on the current page;

requesting an unconditional access restriction on the previous page; and when the unconditional access restriction on the previous page is granted, restricting access to the current page again.

47. The method of claim 46 wherein, if the conditional access restriction on the previous page is denied, the method further comprises, before releasing the access restriction on the current page, identifying a first page key on the current page, and, after the unconditional access restriction on the previous page is granted and access to the current page has been restricted again, the method further comprising:

checking the current page for changes and if the current page has changed then;

checking the current page to determine if the first page key is still first on the current page; and if the first page key is not still first on the current page, releasing the access restriction on the previous page and searching for a new $(n+1)^{th}$ key immediately preceding the $n^{th}$ key.

48. The method of claim 44 further comprising after locating the $(n+1)^{th}$ key immediately preceding the $n^{th}$ key in the reverse range, requesting a conditional access restriction on the $(n+1)^{th}$ key before fetching the $(n+1)^{th}$ key, and if the conditional access restriction on the $(n+1)^{th}$ key is denied:

requesting an unconditional access restriction on the $(n+1)^{th}$ key;

after the unconditional access restriction on the $(n+1)^{th}$ key has been granted, searching for the $n^{th}$ key and positioning on a new $(n+1)^{th}$ key; and if the new $(n+1)^{th}$ key differs from the $(n+1)^{th}$ key, releasing the access restriction on the $(n+1)^{th}$ key, and obtaining an access restriction on the new $(n+1)^{th}$ key.

49. The method of claim 48 further comprising when the $n^{th}$ key in the reverse range contravenes the predefined search criteria and the selected isolation level is below a repeatable read isolation level, after the $(n+1)^{th}$ key has been found and before access to the $(n+1)^{th}$ key has been restricted, releasing the access restriction on the $n^{th}$ key.

* * * * *